US009766082B2

(12) United States Patent
Koshizen

(10) Patent No.: US 9,766,082 B2
(45) Date of Patent: Sep. 19, 2017

(54) SERVER DEVICE, CONGESTION PREDICTION INFORMATION DISPLAY SYSTEM, CONGESTION PREDICTION INFORMATION DISTRIBUTION METHOD, CONGESTION PREDICTION INFORMATION DISPLAY METHOD, AND PROGRAM

(71) Applicant: HONDA MOTOR CO., LTD., Tokyo (JP)

(72) Inventor: Takamasa Koshizen, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/762,535

(22) PCT Filed: Mar. 10, 2014

(86) PCT No.: PCT/JP2014/056127
§ 371 (c)(1),
(2) Date: Jul. 22, 2015

(87) PCT Pub. No.: WO2014/142057
PCT Pub. Date: Sep. 18, 2014

(65) Prior Publication Data
US 2015/0362323 A1 Dec. 17, 2015

(30) Foreign Application Priority Data
Mar. 11, 2013 (JP) .................. 2013-048176

(51) Int. Cl.
*G08G 1/00* (2006.01)
*G01C 21/26* (2006.01)
(Continued)

(52) U.S. Cl.
CPC ......... *G01C 21/26* (2013.01); *G01C 21/3492* (2013.01); *G01C 21/367* (2013.01);
(Continued)

(58) Field of Classification Search
None
See application file for complete search history.

(56) References Cited

U.S. PATENT DOCUMENTS

| 2007/0038360 | A1 | 2/2007 | Sakhpara | |
|---|---|---|---|---|
| 2009/0005965 | A1* | 1/2009 | Forstall | G01C 21/3484 701/533 |
| 2011/0196817 | A1* | 8/2011 | Pryakhin | G01C 21/26 706/14 |

FOREIGN PATENT DOCUMENTS

| CN | 101210825 A | 7/2008 |
|---|---|---|
| CN | 101360972 A | 2/2009 |

(Continued)

OTHER PUBLICATIONS

International Search Report dated Apr. 15, 2014, issued in counterpart application No. PCT/JP2014/056127 (1 page).
Office Action dated May 19, 2016, issued in counterpart Chinese Patent Application No. 201480004881.2, with English translation of the Search Report. (11 pages).

(Continued)

*Primary Examiner* — Angela Ortiz
*Assistant Examiner* — Garrett Evans
(74) *Attorney, Agent, or Firm* — Westerman, Hattori, Daniels & Adrian, LLP

(57) ABSTRACT

An information terminal transmits present position information and acceleration information to a server device. The server device receives the present position information and the acceleration information of the information terminal, generates congestion prediction degree using the acceleration information, associates the congestion prediction degree with map data such that the congestion prediction degree can be displayed on a road map, and transmits association information indicating the association. The information terminal displays the congestion prediction degree on the road map on the display device using the association information transmitted from the server device.

14 Claims, 15 Drawing Sheets

(51) Int. Cl.
*G09B 29/00* (2006.01)
*G09B 29/10* (2006.01)
*G01C 21/34* (2006.01)
*G01C 21/36* (2006.01)
*G08G 1/01* (2006.01)
*G08G 1/0968* (2006.01)
*G08G 1/0969* (2006.01)

(52) U.S. Cl.
CPC ....... *G01C 21/3691* (2013.01); *G08G 1/0112* (2013.01); *G08G 1/0129* (2013.01); *G08G 1/0141* (2013.01); *G08G 1/0969* (2013.01); *G08G 1/096827* (2013.01); *G08G 1/096844* (2013.01); *G09B 29/00* (2013.01); *G09B 29/10* (2013.01)

(56) References Cited

FOREIGN PATENT DOCUMENTS

| | | | |
|---|---|---|---|
| JP | 2002-150495 A | | 5/2002 |
| JP | 2009-140007 A | | 6/2009 |
| JP | 2012-128614 A | | 7/2012 |
| JP | 2012128614 A | * | 7/2012 |
| JP | 2013-29480 A | | 2/2013 |

OTHER PUBLICATIONS

Office Action dated Apr. 19, 2016, issued in counterpart Japanese Patent Application No. 2015-505456, with English translation. (4 pages).

* cited by examiner

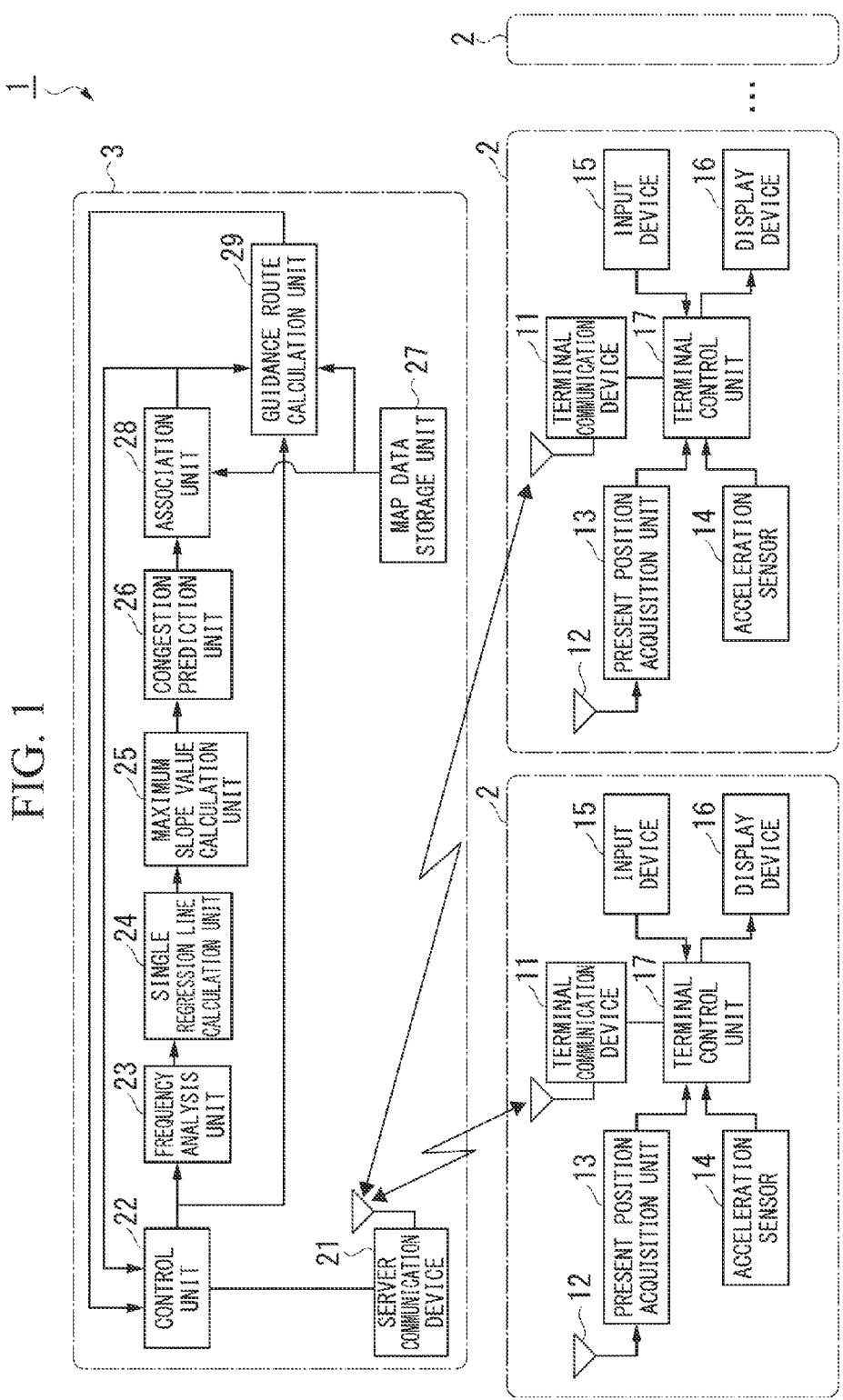

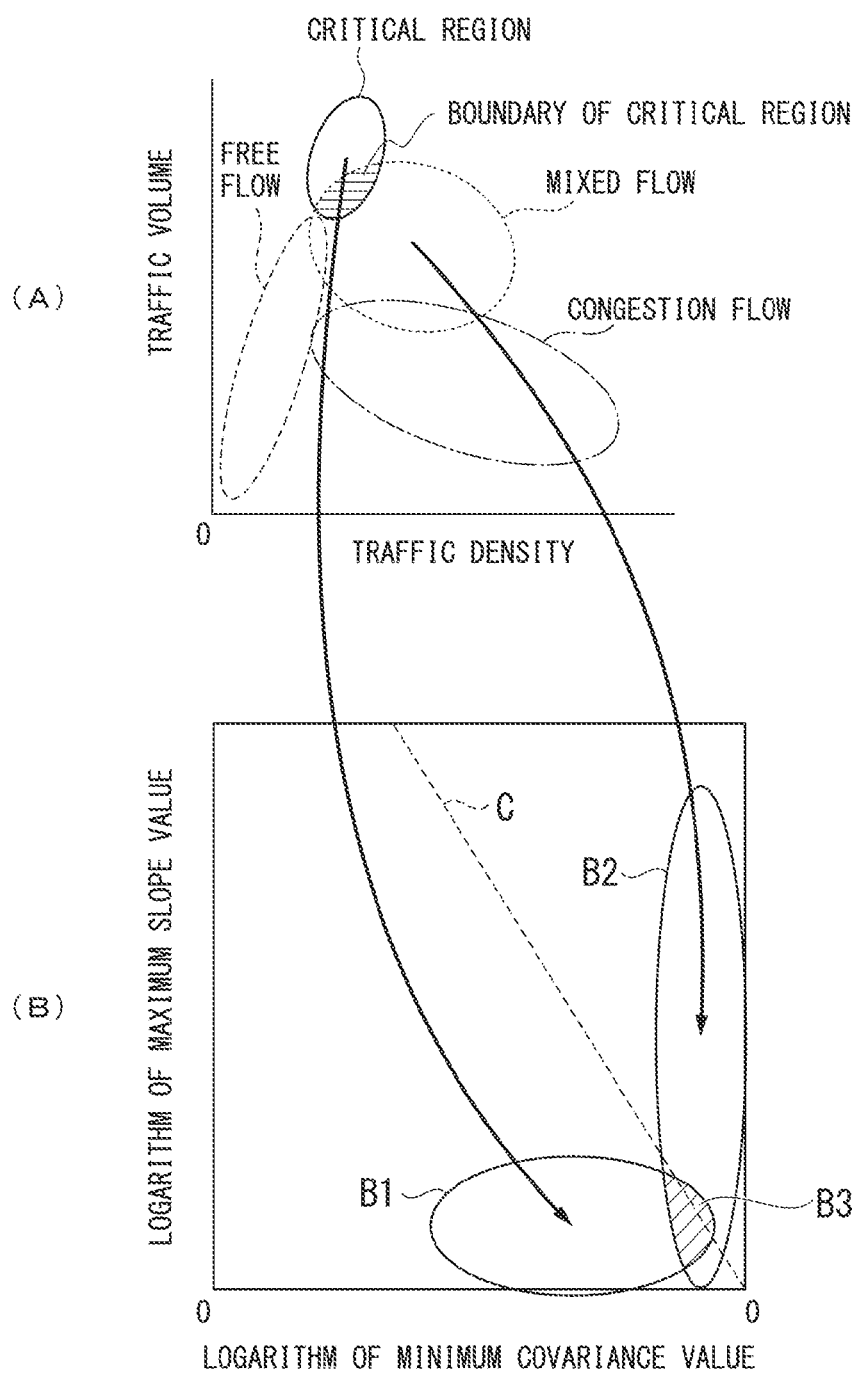

SERVER DEVICE, CONGESTION PREDICTION INFORMATION DISPLAY SYSTEM, CONGESTION PREDICTION INFORMATION DISTRIBUTION METHOD, CONGESTION PREDICTION INFORMATION DISPLAY METHOD, AND PROGRAM

TECHNICAL FIELD

The present invention relates to a server device, a congestion prediction information display system, a congestion prediction information distribution method, a congestion prediction information display method, and a program.

Priority is claimed on Japanese Patent Application No. 2013-048176, filed Mar. 11, 2013, the content of which is incorporated herein by reference.

BACKGROUND ART

In the related art, a system is known, which includes a server device and a plurality of information terminals that can communicate with each other via a wireless communication network system, and in which the server device detects a presence or absence of a traffic congestion based on position information of an information terminal carried by an occupant of a vehicle, the detection result is associated with map information and transmitted to the information terminal, and then, the information terminal displays the presence or absence of the traffic congestion on the map (for example, refer to Patent Document 1).

CITATION LIST

Patent Literature

[Patent Document 1] United States Patent Application, Publication No. 2007/0038360

SUMMARY OF INVENTION

Technical Problem

According to the system in the related art described above, the presence or absence of the traffic congestion only at the present time (accurately, immediately before the present time) is displayed on the map in the information terminal, and the changes of the traffic congestion in the future are not presented. Therefore, there is a problem in that it is difficult to formulate an economic driving plan before starting the driving of the vehicle.

Aspects of the present invention have been made in consideration of above-described circumstances and have an object to provide a server device, a congestion prediction information display system, a congestion prediction information distribution method, a congestion prediction information display method, and a program which can improve the economy of the vehicle driving.

Solution to Problem

In order to solve the above problems and to achieve the object described above, the present invention adopts the following aspects.

(1) A server device according to an aspect of the present invention includes: a position information acquisition portion configured to acquire position information of a moving body; a congestion prediction information output portion configured to acquire or generating congestion prediction information which is based on the acceleration information of the moving body, and for outputting the congestion prediction information; a map data storage portion configured to store map data of a road map; an association portion configured to associate congestion prediction information with the map data stored in the map data storage portion using the position information acquired by the position information acquisition portion such that the congestion prediction information output from the congestion prediction information output portion can be displayed on the road map, and for generating association information that indicates the association; and a transmission portion configured to transmit the association information generated by the association portion to the outside.

(2) In the server device described in the above (1), the congestion prediction information output portion may include an acceleration information acquisition portion configured to acquire acceleration information of the moving body, and a congestion prediction information generation portion configured to generate the congestion prediction information based on the acceleration information acquired by the acceleration information acquisition portion.

(3) In the server device described in the above (1) or (2), the map data may include data of points on the road and data of road sections that connect the points. The association portion may associate a display color corresponding to the congestion prediction information with the road section or the point in the map data such that the road section or the point having the display color corresponding to the congestion prediction information can be displayed on the road map.

(4) In the server device described in the above (3), the map data may include cost data that indicates a distance of the road section or a time required for moving the road section. The server device may further include an instruction information acquisition portion configured to acquire instruction information which instructs the calculation of the guidance route from a departure point to a destination and information of the departure point and destination; and a guidance route calculation portion configured to correct the cost data stored in the map data storage portion using the association information generated by the association portion in a case where the instruction information is acquired by the instruction information acquisition portion, and for calculating the guidance route using the corrected cost data. The transmission portion may transmit the guidance route information calculated by the guidance route calculation portion to the outside.

(5) In the server device described in the above (4), the guidance route calculation portion may calculate the guidance route by giving priority to reducing the time required for moving on the guidance route or on reducing the consumption of energy required for moving on the guidance route.

(6) A congestion prediction information display system according to another aspect of the present invention is a system including the server device described in the above (1), an information terminal, and a display device. The information terminal includes a terminal reception portion configured to receive the association information transmitted from the server device, and a display control portion configured to display the congestion prediction information on the road map on the display device using the association information received by the terminal reception portion.

(7) In the congestion prediction information display system described in the above (6), the information terminal may further include the display device, a position detection portion configured to detect a position of the information terminal, an acceleration detection portion configured to detect acceleration of the information terminal, and a terminal transmission portion configured to transmit the position information detected by the position detection portion and the acceleration information detected by the acceleration detection portion to the server device. The congestion prediction information output portion of the server device may include an acceleration information acquisition portion configured to receive the acceleration information transmitted from the information terminal as acceleration information of the moving body, and a congestion prediction information generation portion configured to generate the congestion prediction information using the acceleration information acquired by the acceleration information acquisition portion. The position information acquisition portion of the server device may receive the position information transmitted from the information terminal as position information of the moving body.

(8) In the congestion prediction information display system described in the above (6), the information terminal may further include the display device, a position detection portion configured to detect a position of the information terminal, an acceleration detection portion configured to detect acceleration of the information terminal, a terminal congestion prediction information generation portion configured to generate the congestion prediction information using the acceleration information detected by the acceleration detection portion, and a terminal transmission portion configured to transmit the position information detected by the position detection portion and the congestion prediction information generated by the terminal congestion prediction information generation portion to the server device. The congestion prediction information output portion of the server device may receive the congestion prediction information transmitted from the information terminal as the congestion prediction information of the moving body. The position information acquisition portion of the server device may receive the position information transmitted from the information terminal as the position information of the moving body.

(9) In the congestion prediction information display system described in any one of the above (6) to (8), the information terminal may further include a terminal map data storage portion configured to store the map data. The map data may include data of a point on the road and data of a road section that connects the points. The display control portion may display the congestion prediction information on the road map which is obtained from the map data stored in the terminal map data storage portion on the display device using the association information received by the terminal reception portion.

(10) In the congestion prediction information display system described in the above (9), the map data may include cost data that indicates a distance of the road section or a time required for moving on the road section. The information terminal may further include a terminal information acquisition portion configured to acquire instruction information which instructs the calculation of the guidance route from a departure point to a destination and information of the departure point and destination, and a terminal guidance route calculation portion configured to correct the cost data stored in the terminal map data storage portion using the association information received by the terminal reception portion in a case where the instruction information is acquired by the terminal information acquisition portion, and for calculating the guidance route using the corrected cost data.

(11) A congestion prediction information distribution method according to another aspect of the present invention is executed by a server device including a map data storage portion configured to store map data of a road map. The congestion prediction information distribution method includes: a position information acquisition step of acquiring position information of moving body and outputting the congestion prediction information; a congestion prediction information output step of acquiring or generating congestion prediction information which is based on acceleration information of the moving body; an association step of associating the congestion prediction information with the map data stored in the map data storage portion using the position information acquired in the position information acquisition step such that the congestion prediction information output in the congestion prediction information output step can be displayed on the road map, and of generating association information that indicates the association; and a transmission step of transmitting the association information generated in the association step to the outside.

(12) A congestion prediction information display method according to another aspect of the present invention is executed by a congestion prediction information display system that includes a server device including a map data storage portion configured to store map data of a road map, an information terminal, and a display device. The congestion prediction information display method includes: a position information acquisition step of causing the server device to acquire position information of a moving body; a congestion prediction information output step of causing the server device to acquire or generate congestion prediction information which is based on the acceleration information of the moving body, and to output the congestion prediction information; an association step of causing the server device to associate congestion prediction information with the map data stored in the map data storage portion using the position information acquired in the position information acquisition step such that the congestion prediction information output in the congestion prediction information output step can be displayed on the road map, and to generate association information that indicates the association; a transmission step of causing the server device to transmit the association information generated in the association step to the outside; a terminal transmission step of causing the information terminal to receive the association information transmitted from the server device, and a display control step of causing the information terminal to display the congestion prediction information on the road map on the display device using the association information received in the terminal transmission step.

(13) A program according to another aspect of the present invention causes a computer configuring a server device which includes a map data storage portion configured to store map data of a road map to function as: a position information acquisition portion configured to acquire position information of a moving body; a congestion prediction information output portion configured to acquire or generating congestion prediction information which is based on the acceleration information of the moving body, and for outputting the congestion prediction information; an association portion configured to associate congestion prediction information with the map data stored in the map data storage portion using the position information acquired by the position information acquisition portion such that the congestion prediction information output from the congestion prediction information output portion can be displayed on the road map, and for generating association information that indicates the association; and a transmission portion configured to transmit the association information generated by the association portion to the outside.

(14) A program according to another aspect of the present invention causes a computer configuring an information terminal of a congestion prediction information display system that includes the server device described in the above (1), the information terminal, and a display device to function as: a terminal reception portion configured to receive the association information transmitted from the server device; and a display control portion configured to display the congestion prediction information on the road map on the display device using the association information received by the terminal reception portion.

Advantageous Effects of Invention

According to the server device in the aspect described in the above (1) or (2), by generating the association information such that the congestion prediction information can be displayed on the road map, it is possible to present how the future congestion varies on the road map. In this way, in the device on which the road map can be displayed, the congestion prediction information can be displayed on the road map, and thus, it is possible to cause a device which can set the driving plan and a driver who recognizes the congestion prediction information displayed on the device to set or formulate an economic driving plan before driving a moving body such as a vehicle.

In the case of the above (3), it is possible to cause the driver who recognizes the road map displayed on the device on which the road map can be displayed to easily recognize whether a traffic congestion easily occurs or hardly occurs in the future on any road section or point on the road map.

In the case of the above (4), the congestion can more accurately be avoided, and furthermore, the forming of the congestion can be suppressed compared to the case of calculating the guidance route without correcting the cost data corresponding to the distance of the road section by the association information, and thus, it is possible to calculate the more economic guidance route.

In addition, the guidance route in which irregular and unexpected events are more accurately reflected can be calculated compared to the case where the guidance route is calculated using statistical information of the traffic congestion, and thus, it is possible to improve a calculation accuracy and reliability of the economic guidance route.

In the case of the above (5), when priority is given to reducing the time required for moving on the guidance route, the guidance route in which the average moving speed is higher and the congestion more hardly occurs can be calculated compared to the case of calculating the guidance route without correcting the cost data by the association information, and thus, it is possible to improve the accuracy of reducing the time and reliability. In addition, when priority is given to reducing the consumption of energy required for moving on the guidance route, the guidance route in which the generation frequency of the acceleration is low or the guidance route in which the variation of the speed is low can be calculated, and thus, it is possible to improve an accuracy of reducing the energy consumption and reliability.

According to the congestion prediction information display system in the aspect described in the above (6), by the information terminal displaying the congestion prediction information on the road map on the display device, it is possible to enable the operator of the information terminal to formulate an economic driving plan before the driving of the moving body such as the vehicle.

In the case of the above (7) or (8), the information terminal is assumed to be a portable terminal carried by an occupant of the moving body such as the vehicle or a navigation device mounted on the moving body. From the server device, the information terminal can receive the association information indicating that the congestion prediction information in which the position and acceleration information of the information terminal itself is reflected is associated with the map data. Thus, it is possible to formulate the more economic driving plan with respect to the moving body that moves together with the information terminal.

In the case of the above (9), by the terminal map data storage portion configured to store the map data being included in the information terminal, the server device does not need to transmit the map data associated with the congestion prediction information as the association information, and thus, it is possible to prevent an increase in communication volume.

In the case of the above (10), the congestion can more accurately be avoided, and furthermore, the forming of the traffic congestion can be suppressed compared to the case of calculating the guidance route without correcting the cost data corresponding to the distance of the road section by the association information, and thus, it is possible to calculate the more economic guidance route.

In addition, the guidance route can be calculated, in which irregular and unexpected events are more accurately reflected compared to the case where the guidance route is calculated using statistical information of the traffic congestion, and thus, it is possible to improve a calculation accuracy and reliability of the economic guidance route.

According to the congestion prediction information distribution method in the aspect described in the above (11), by generating the association information such that the congestion prediction information can be displayed on the road map, it is possible to present the variations of the future congestion on the road map. In this way, in the device on which the road map can be displayed, the congestion prediction information can be displayed on the road map, and thus, it is possible to cause a device which can set the driving plan and a driver who recognizes the congestion prediction information displayed on the device to set or formulate an economic driving plan before driving a moving body such as a vehicle.

According to the congestion prediction information display method in the aspect described in the above (12), by the information terminal displaying the congestion prediction information on the road map on the display device, it is possible to enable the operator of the information terminal to formulate an economic driving plan before the driving of the moving body such as the vehicle.

According to the program in the aspect described in the above (13), by generating the association information such that the congestion prediction information can be displayed on the road map, it is possible to present how the future traffic congestion varies on the road map. In this way, in the device on which the road map can be displayed, the congestion prediction information can be displayed on the road map, and thus, it is possible to cause a device which can set the driving plan and a driver who recognizes the congestion prediction information displayed on the device to set or formulate an economic driving plan before driving a moving body such as a vehicle.

According to the program in the aspect described in the above (14), by the information terminal displaying the congestion prediction information on the road map on the display device, it is possible to enable the operator of the information terminal to formulate an economic driving plan before the driving of the moving body such as the vehicle.

BRIEF DESCRIPTION OF DRAWINGS

FIG. 1 is a configuration diagram of a congestion prediction information display system in an embodiment of the present invention.

FIG. 11 is a diagram illustrating an example of a correlation map between a logarithm of the minimum covariance value of a vehicle-to-vehicle distance distribution and a logarithm of a maximum slope of the acceleration spectrum in the second modification example in the embodiment of the present invention.

DESCRIPTION OF EMBODIMENTS

Figure 2A:
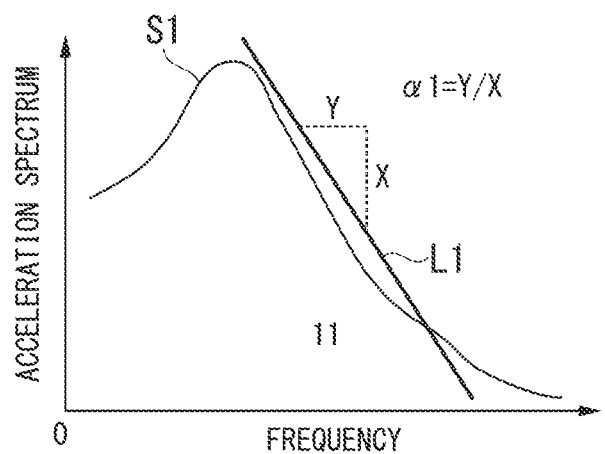
FIG. 2A is a diagram illustrating an example of an acceleration spectrum in the embodiment of the present invention.

Hereinafter, an embodiment of a server device, a congestion prediction information display system, a congestion prediction information distribution method, a congestion prediction information display method, and a program of the present invention will be described with reference to the drawings.

A congestion prediction information display system 1 in the present embodiment includes at least one or more information terminals 2 and a server device 3 that can communicate with the information terminal 2.

The information terminal 2 is a mobile terminal carried by an occupant of a moving body such as a vehicle or an information device that is detachably mounted on the moving body such as a vehicle. The information terminal 2 can bi-directionally communicate with the server device 3 through a wireless communication via a wireless communication network system that includes, for example, base stations.

The wireless communication network system includes, for example, a base station for the wireless communication and a public telecommunication network such as the internet that makes the wired connection between the base station and the server device 3. In the wireless communication network system, information transmitted from the server device 3 through a wired communication is received by the base station, and transmitted to the information terminal 2 from the base station through the wireless communication. In addition, information transmitted from the information terminal 2 through the wireless communication is received by the base station and transmitted to the server device 3 from the base station through the wired communication.

The information terminal 2 includes a terminal communication device 11, a positioning signal receiver 12, a present position acquisition unit 13, an acceleration sensor 14, an input device 15, a display device 16, and a terminal control unit 17.

The terminal communication device 11 can communicate with the server device 3 via, for example, a client-server type wireless communication network system, and transmits and receives various signals. The communication between the information terminal 2 and the server device 3 is not limited to the communication type described above, but other communication types such as communication via a communication satellite may be adopted.

The positioning signal receiver 12 receives a positioning signal that is used in a positioning system (for example, the Global Positioning System (GPS) or the Global Navigation Satellite System (GNSS)) for measuring the position of the information terminal 2 by using, for example, a satellite.

The present position acquisition unit 13 detects a present position of the information terminal 2 using the positioning signal received by the positioning signal receiver 12.

The acceleration sensor 14 detects acceleration acting on the information terminal 2.

The input device 15 includes, for example, a switch, a touch panel, a keyboard, and a voice input device, and outputs signals according to various input operations by an operator.

The display devices 16 are various displays that include a display screen such as a liquid crystal display screen, and display various information items output from the terminal control unit 17.

The terminal control unit 17 controls various operations of the information terminal 2.

The terminal control unit 17 transmits present position information acquired by the present position acquisition unit 13 and acceleration information detected by the acceleration sensor 14 to the server device 3 through the terminal communication device 11.

The terminal control unit 17 transmits instruction information which instructs the calculation of a guidance route and which is input from the input device 15 by the operator and information of the departure point and the destination of the guidance route, to the server device 3 through the terminal communication device 11. The instruction information which instructs the calculation of a guidance route includes information that instructs giving priority to reducing the time required for moving on the guidance route or information that instructs giving priority to reducing the consumption of energy required for moving on the guidance route.

The terminal control unit 17 receives association information transmitted from the server device 3 through the terminal communication device 11.

The terminal control unit 17 causes the display device 16 to display congestion prediction degree information included in the association information on the road map in the map data included in the association information using the association information received from the server device 3 through the terminal communication device 11. For example, the terminal control unit 17 causes the display device 16 to display a road section or a point having a display color according to the congestion prediction degree on the road map.

The server device 3 includes a server communication device 21, a control unit 22, a frequency analysis unit 23, a single regression line calculation unit 24, a maximum slope value calculation unit 25, a congestion prediction unit 26, a map data storage unit 27, an association unit 28, and a guidance route calculation unit 29.

The server communication device 21 can communicate with the terminal communication device 11 of the information terminal 2 and transmits and receives various information items.

The control unit 22 controls various operations of the server device 3.

The control unit 22 transmits the association information generated by the below-described association unit 28 to the information terminal 2 through the server communication device 21.

The control unit 22 transmits the guidance route information calculated by the below-described guidance route calculation unit 29 to the information terminal 2 through the server communication device 21.

The control unit 22 outputs the present position and the acceleration information received from the information terminal 2 through the server communication device 21 to the frequency analysis unit 23.

The control unit 22 outputs the instruction information which instructs the calculation of the guidance route and information of the departure point and the destination of the guidance route received from the information terminal 2 through the server communication device 21 to the guidance route calculation unit 29.

The frequency analysis unit 23 performs a frequency analysis on the acceleration received from the information terminal 2 through the server communication device 21 and calculates a power spectrum corresponding to the frequency.

Figure 2B:
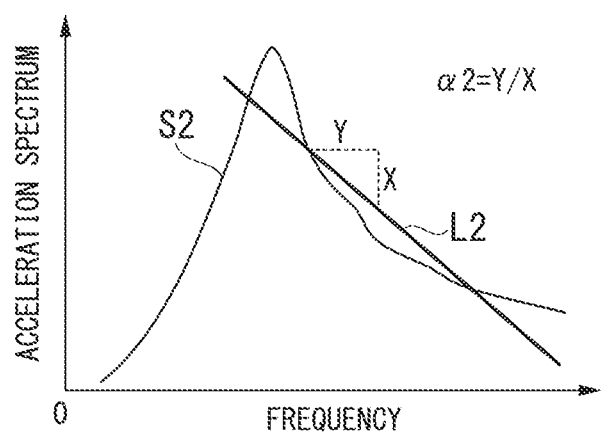
FIG. 2B is a diagram illustrating an example of an acceleration spectrum in the embodiment of the present invention.

For example, by performing the frequency analysis on the acceleration of the vehicle detected by the acceleration sensor 14 in two different appropriate traveling states of the vehicle which is moving together with the information terminal 2, the acceleration spectra S1 and S2 corresponding to the frequency are calculated as the power spectra illustrated in FIGS. 2A and 2B.

The single regression line calculation unit 24 calculates a single regression line in the power spectrum calculated by the frequency analysis unit 23.

For example, single regression lines L1 and L2 are calculated with respect to the acceleration spectra S1 and S2 illustrated in FIGS. 2A and 2B.

The maximum slope value calculation unit 25 calculates the maximum value of a variation amount of the slope of the single regression line within a predetermined frequency range with respect to the single regression line calculated by the single regression line calculation unit 24 as a maximum slope value.

For example, the maximum slope value calculation unit 25 calculates slopes $\alpha 1$ and $\alpha 2$ ($=Y/X$) with respect to the single regression lines L1 and L2 illustrated in FIGS. 2A and 2B based on the variation X of the spectrum value within the predetermined frequency range Y (for example, 0 to 0.5 Hz which is a frequency range corresponding to a time range of a few seconds to a few minutes).

The congestion prediction unit 26 calculates the congestion prediction degree that indicates a possibility of future traffic congestion (traffic jam) occurring or a possibility that congestion has already occurred according to the maximum slope value calculated by the maximum slope value calculation unit 25. The congestion prediction degree is, for example, a parameter according to the maximum slope value, and becomes large in the case where the possibility of congestion is high and becomes small in the case where the possibility of congestion is low in the traveling direction of the vehicle that moves together with the information terminal 2. In addition, a predetermined threshold value that determines whether the congestion prediction degree is large or small can be set to an arbitrary value. However, the predetermined threshold value can be set to "−45 degrees" which is generally known as (1/f) fluctuation property.

For example, in the case where an absolute value of the slope a of the single regression line calculated by the single regression line calculation unit 24 is small, the case corresponds to the case where a shock wave (a vibration or a fluctuation) received from a preceding vehicle is small and then, a response delay to the preceding vehicle is small. Thus, the vehicle-to-vehicle distance becomes long and a vehicle group is unlikely to be formed, that is, the above case corresponds to the case where the possibility of the congestion occurring is low. In this case, the congestion prediction degree has a small value.

Conversely, in the case where an absolute value of the slope a is large, the case corresponds to the case where the shock wave (the vibration or the fluctuation) received from a preceding vehicle is large and then, a response delay to the preceding vehicle is large. Thus, the vehicle group is likely to be dense, that is, the case corresponds to the case where the possibility of the congestion occurring is high. In this case, the congestion prediction degree has a large value.

The shock wave (the vibration or the fluctuation) described here means, by repeatedly operating the acceleration and the deceleration of the vehicle, that an operation (front and backward movement) is propagated to a following vehicle as a kind of vibration.

Therefore, the congestion prediction unit 26 calculates the congestion prediction degree according to the magnitude of the slope a of the single regression line calculated by the single regression line calculation unit 24, specifically, the maximum slope value calculated by the maximum slope value calculation unit 25.

For example, the congestion prediction unit 26 obtains a function (for example, $y=ax+b$) that indicates a relationship between the maximum slope value (x) and the congestion prediction degree (y) in advance, and calculates the congestion prediction degree (y) with respect to the maximum slope value (x) calculated by the maximum slope value calculation unit 25.

The congestion prediction unit 26 creates a relationship between the maximum slope value and the value of the corresponding congestion prediction degree in advance and stores the relationship as a table, and then, it is possible to obtain the congestion prediction degree corresponding to the calculated maximum slope value with reference to the table.

The map data storage unit 27 stores the map data.

The map data includes road coordinate data indicating the position coordinate on the road which is necessary for map matching processing based on the present position of the information terminal 2 and road map data (for example, a node, a link, a link cost, a road shape and the type of road) which is necessary for the calculation of the guidance route. The node is a coordinate point formed of latitude and longitude of a predetermined point on the road such as intersections and branching points. The link is a line linking the nodes and is a road section that connects the points. The link cost is information (cost data) indicating a distance of the road section corresponding to the link or time required for moving the road section.

The association unit 28 associates the congestion prediction degree with the map data such that the congestion prediction degree calculated by the congestion prediction unit 26 can be displayed on the road map of the map data using the present position information received from the information terminal 2 through the server communication device 21. Then, the association unit 28 generates the association information that indicates the association of the congestion prediction degree with the map data.

For example, the association unit 28 associates the display color corresponding to the congestion prediction degree with the road section or the point in the map data such that the road section or the point having the display color corresponding to the congestion prediction degree can be displayed on the road map. Specifically, in the case where the congestion prediction degree calculated by the congestion prediction unit 26 indicates a non-congestion trend, the association unit 28 associates the road section or the point corresponding to this congestion prediction degree with a display color of green, and in the case where the congestion prediction degree indicates a congestion trend, the association unit 28 associates the road section or the point corresponding to this congestion prediction degree with a display color of blue.

The congestion trend indicated by the congestion prediction degree is an unregulated trend of a traffic flow and corresponds to the case where the absolute value of the maximum slope value calculated by the maximum slope value calculation unit 25 is greater than the predetermined value range (for example, the range from 30° to 45°), and indicates that the possibility of the congestion occurring in the future in front of the traveling direction of the vehicle is high (further, the possibility that the congestion has already occurred is high).

On the other hand, the non-congestion trend indicated by the congestion prediction degree is a regulated trend of a traffic flow and corresponds to the case where the absolute value of the maximum slope value calculated by the maximum slope value calculation unit 25 is smaller than the predetermined value range (for example, the range from 30° to 45°), and indicates that the possibility of the congestion occurring in the future in front of the traveling direction of the vehicle is low (further, the possibility that the congestion has already occurred is low).

The association information may be correspondence relation data formed from the map that indicates the correspondence relation between, for example, the congestion prediction degree information and the node or the link in the map data.

In addition, the association information may be the map data formed from the node or the link in which the congestion prediction degree information is added according to the correspondence relation data.

In addition, for example, in the case where a map screen is formed by a superposition of multiple layers, the association information may be layer data of the congestion prediction degree superposed to the layer of the node or the link in the map data according to the correspondence relation data.

In addition, the association information may be data of the map screen formed by the map data in which the congestion prediction degree information is added or data of the map screen formed by the layer of the congestion prediction degree being superposed to the layer of the map data.

The association unit 28 may associate each of a plurality of congestion prediction degree information items obtained from a plurality of information terminals 2 with the map data.

In addition, the association unit 28 may associate, for example, only any of the information (for example, information of which the congestion prediction degree is equal to or greater than the predetermined value) among the plurality of congestion prediction degree information items obtained from the plurality of information terminals 2 with the map data.

In addition, the association unit 28 may associate the average information of the plurality of congestion prediction degree information items obtained from the plurality of information terminals 2 with the map data.

In the case where the instruction information that instructs to calculate the guidance route and the information of the departure point and the destination on the guidance route are received from the information terminal 2 through the server communication device 21, the guidance route calculation unit 29 corrects the link cost stored in the map data storage unit 27 using the association information generated by the association unit 28, and calculates the guidance route using the corrected link cost.

For example, the guidance route calculation unit 29 corrects the link cost to an increasing trend in which the link cost increases along with the congestion prediction degree obtained from the vehicle in the road section corresponding to the link becoming higher than the predetermined value.

On the other hand, in the case where the congestion prediction degree becomes lower than the predetermined value, the correction of the link cost is not performed or the link cost is corrected in a decreasing trend. For example, in the case where even one vehicle of which the congestion prediction degree is high exists even in a state in which the number of vehicles in the road section is small, the guidance route calculation unit 29 corrects the link cost to the increasing trend. On the other hand, in the case where the vehicle of which the congestion prediction degree is high does not exist even in a state in which the number of vehicles in the road section is large, the correction of the link cost is not performed or the link cost is corrected in the decreasing trend.

Then, the guidance route calculation unit 29 calculates the guidance route according to the information that instructs giving priority to reducing the time required for moving on the guidance route or information that instructs giving priority to reducing the consumption of energy required for moving on the guidance route that are included in the instruction information which instructs the calculation of the guidance route.

The congestion prediction information display system 1 in the present embodiment has a configuration described above. Next, the operation (that is, a congestion prediction information display method) of the congestion prediction information display system 1 will be described.

Hereinafter, the operation of the information terminal 2 will be described.

Figure 3A:
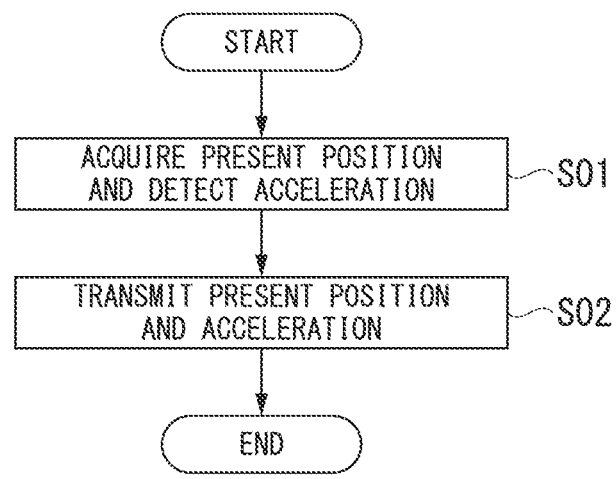
FIG. 3A is a flowchart illustrating an operation of an information terminal in the embodiment of the present invention.
Figure 3B:
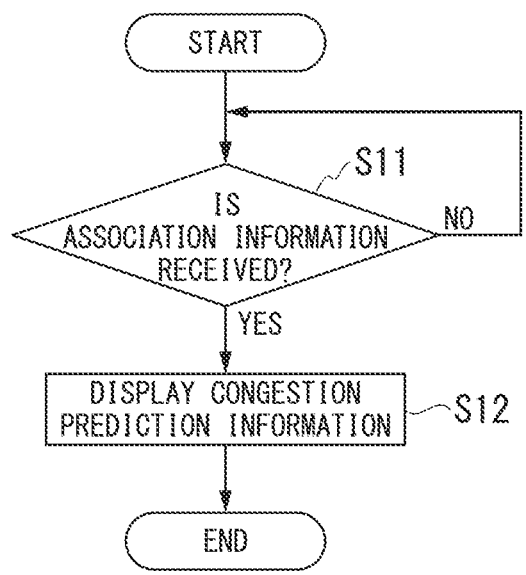
FIG. 3B is a flowchart illustrating an operation of an information terminal in the embodiment of the present invention.

In the information terminal 2, each processing illustrated in FIGS. 3A and 3B is independently and repeatedly performed in a predetermined period.

First, for example, in STEP S01 illustrated in FIG. 3A, the present position of the information terminal 2 is acquired by the present position acquisition unit 13 and the acceleration of the information terminal 2 is detected by the acceleration sensor 14.

Next, in STEP S02, the present position information and the acceleration information are transmitted to the server device 3, and the process proceeds to "end".

In addition, in STEP S11 (terminal receiving step) illustrated in FIG. 3B, it is determined whether or not the association information is received from the server device 3.

In the case where the determination result is "NO", the determination processing in STEP S11 is repeated.

On the other hand, in the case where the determination result is "YES", the process proceeds to STEP S12.

Then, in STEP S12 (display control step), the congestion prediction degree is displayed on the road map on the display device 16 using the association information, and the process proceeds to "end".

Hereinafter, the operation (that is, a congestion prediction information distribution method) of the server device 3 will be described.

Figure 4:
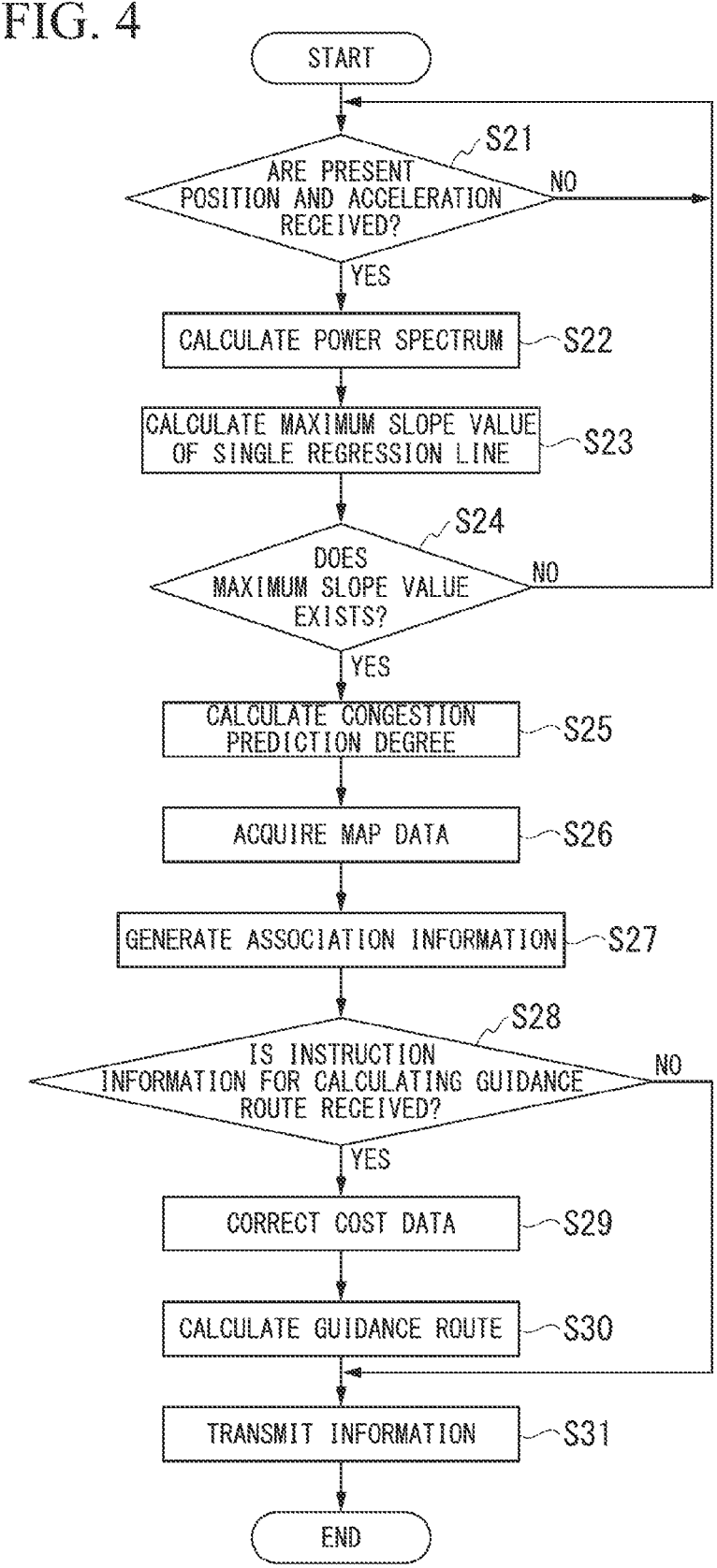
FIG. 4 is a flowchart illustrating an operation of a server device in the embodiment of the present invention.

In the server device 3, the processing illustrated in FIG. 4 is repeatedly performed in a predetermined period.

First, for example, in STEP S21 (a position information acquisition step or a congestion prediction information output step) illustrated in FIG. 4, it is determined whether or not the present position information and the acceleration information of the information terminal 2 are received from the information terminal 2.

In the case where the determination result is "NO", the determination processing in STEP S21 is repeated.

On the other hand, in the case where the determination result is "YES", the process proceeds to STEP S22.

Next, in STEP S22 (the congestion prediction information output step), the frequency analysis is performed on the acceleration of the information terminal 2, and the power spectrum corresponding to the frequency is calculated.

Next, in STEP S23 (the congestion prediction information output step), the single regression line in the power spectrum is calculated, and the maximum value of the amount of variations of the slope of the single regression line within the predetermined frequency range is calculated as the maximum slope value.

Next, in STEP S24 (the congestion prediction information output step), it is determined whether or not the maximum slope value (for example, the maximum slope value equal to or greater than the predetermined value) is calculated.

In the case where the determination result is "NO", the process returns to STEP S21.

On the other hand, in the case where the determination result is "YES", the process proceeds to STEP S25.

Then, in STEP S25 (the congestion prediction information output step), the congestion prediction degree that indicates the possibility of occurring the congestion in the future, and further, the possibility that the congestion has already occurred is calculated according to the absolute value of the maximum slope value.

Next, in STEP S26, the map data of a predetermined range is acquired from the map data storage unit 27 according to the present position of the information terminal 2.

Next, in STEP S27 (an association step), the congestion prediction degree is associated with the map data such that the congestion prediction degree can be displayed on the road map in the map data, and the association information that indicates the association of the congestion prediction degree with the map data is generated. For example, in the case where the absolute value of the maximum slope value is greater than the predetermined range (for example, the range of 30° to 45°), the congestion prediction degree is assumed to indicate the congestion trend, and thus, the display color of blue is associated with the road section or the point. On the other hand, in the case where the absolute value of the maximum slope value is smaller than the predetermined range (for example, the range of 30° to 45°), the congestion prediction degree is assumed to indicate the non-congestion trend, and thus, the display color of green is associated with the road section or the point.

Next, in STEP S28, it is determined whether or not the instruction information which instructs the calculation of the guidance route and the information of the departure point and the destination of the guidance route are received from the information terminal 2.

In the case where the determination result is "NO", the process proceeds to STEP S31 described below.

On the other hand, in the case where the determination result is "YES", the process proceeds to STEP S29.

Next, in STEP S29, the link cost stored in the map data storage unit 27 is corrected according to the association information.

Next, in STEP S30, the guidance route from the departure point to the destination is calculated using the corrected link cost according to the information which instructs giving priority to reducing the time required for moving on the guidance route or the information which instructs giving priority to reducing the consumption of energy required for moving on the guidance route that are included in the instruction information which instructs the calculation of the guidance route.

Next, in STEP S31 (a transmission step), the association information that indicates the association of the congestion prediction degree with the map data, or the association information and the guidance route information are transmitted to the information terminal 2, and the process proceeds to "end".

As described above, according to the server device 3 and the congestion prediction information distribution method in the present embodiment, by generating the association information such that the congestion prediction degree can be displayed on the road map, it is possible to present on the road map how the future congestion varies. In this way, in the information terminal 2 on which the road map can be displayed, the congestion prediction degree can be displayed on the road map and thus, it is possible to cause the information terminal 2 which can set the driving plan and the driver who recognizes the congestion prediction degree displayed on the information terminal 2 to set or formulate an economic driving plan before driving the moving body such as the vehicle.

Furthermore, by associating the display color corresponding to the congestion prediction degree with the road section or the point in the map data, it is possible to cause the driver who recognizes the road map displayed on the information terminal 2 in which the road map can be displayed to easily recognize whether the congestion easily occurs or hardly occurs in the future on any of the road sections or the points on the road map.

Furthermore, the congestion can be avoided more accurately and further, the forming of the congestion can be suppressed compared to the case of calculating the guidance route without correcting the link cost corresponding to the distance of the road section by the association information, and thus, it is possible to calculate the more economic guidance route.

In addition, the guidance route can be calculated, in which irregular and unexpected events are more accurately reflected compared to the case of calculating the guidance route using statistical information of congestion, and thus, it is possible to improve a calculation accuracy and reliability of the economic guidance route.

Furthermore, when priority is given to reducing the time required for moving on the guidance route, the guidance route in which the average moving speed is higher and the congestion more hardly occurs can be calculated compared to the case of calculating the guidance route without correcting the link cost by the association information, and thus, it is possible to improve the accuracy of reducing the time and reliability. In addition, when priority is given to reducing the consumption of energy required for moving on the guidance route, the guidance route in which the generation frequency of the acceleration is low or the guidance route in which the variation of the speed is low can be calculated, and thus, it is possible to improve an accuracy of reducing the energy consumption and reliability.

Furthermore, according to the congestion prediction information display system 1 and the congestion prediction information display method in the present embodiment, by the information terminal 2 displaying the congestion prediction degree information on the road map on the display device 16, it is possible to enable the operator of the information terminal 2 to formulate an economic driving plan before the driving of the vehicle.

Furthermore, the present position information and the acceleration information of the information terminal 2 are transmitted to the server device 3 from the information terminal 2 that moves together with the moving body such as the vehicle. In this way, from the server device 3, the information terminal 2 can receive the association information where the congestion prediction degree, in which the present position information and the acceleration information of the information terminal 2 itself are reflected, is associated with the map data. Thus, it is possible to formulate the more economic driving plan with respect to the moving body that moves together with the information terminal 2.

In the embodiment described above, in the information terminal 2 that receives the association information from the server device 3, the positioning signal receiver 12, the present position acquisition unit 13, and the acceleration sensor 14 may be eliminated.

In this case, the server device 3 acquires the present position information and the acceleration information of the moving body such as the vehicle from a device other than the information terminal 2, generates the association information using the acquired present position information and the acceleration information, and transmits the generated association information to the information terminal 2 according to the request of the information terminal 2. The information terminal 2 receives the association information from the server device 3 and displays the congestion prediction degree on the road map on the display device 16 using the received association information.

Figure 5:
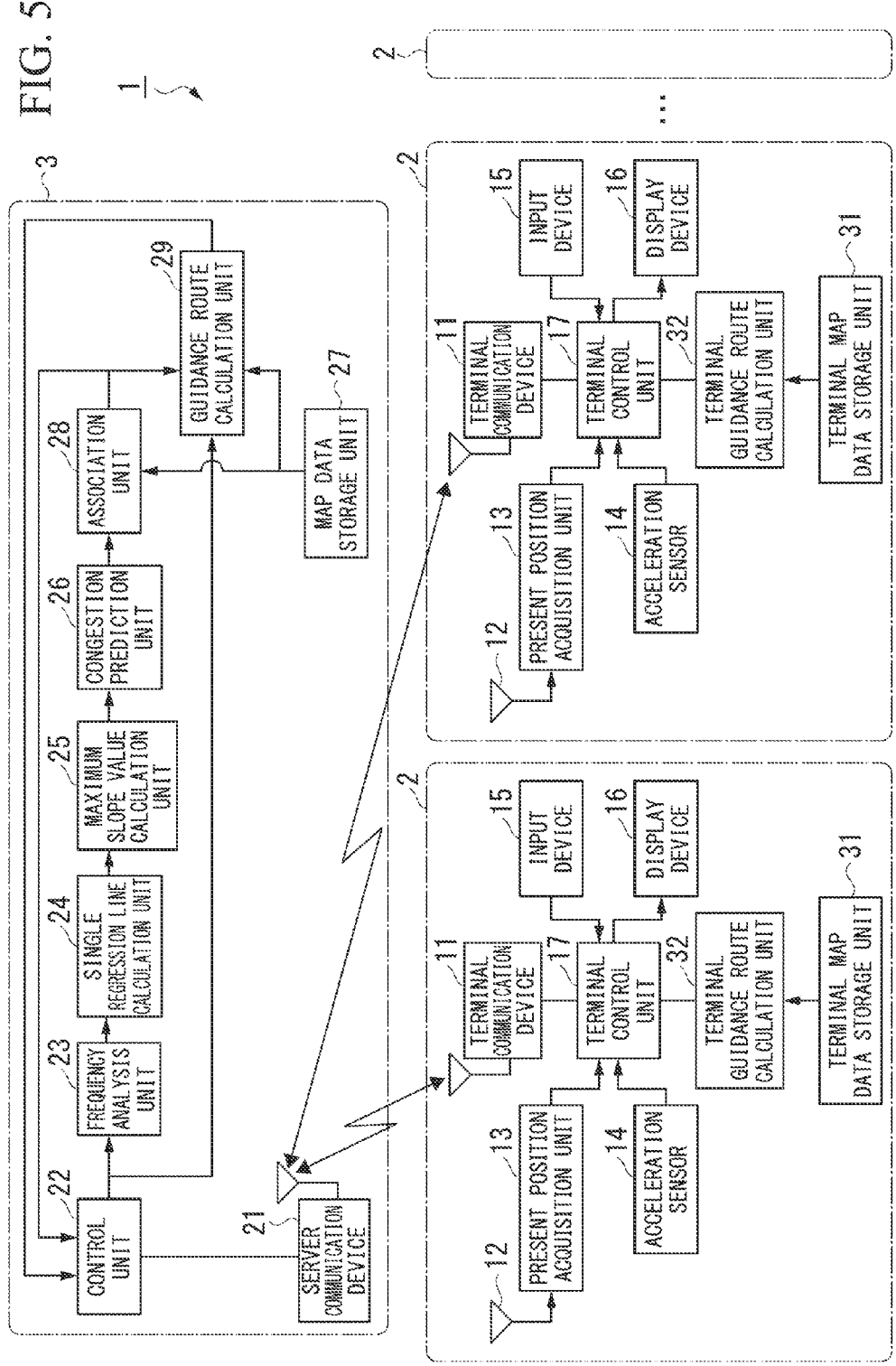
FIG. 5 is a configuration diagram of a congestion prediction information display system in a first modification example in the embodiment of the present invention.

In the embodiment described above, for example, as a congestion prediction information display system 1 in a first modification example illustrated in FIG. 5, the information terminal 2 may include a terminal map data storage unit 31 that stores the map data.

In this case, the server device 3 omits the map data among the associated congestion prediction degree information and the map data, and includes the congestion prediction degree information and the information indicating the association of the congestion prediction degree with the map data to configure the association information. The information terminal 2 which received the association information displays the congestion prediction degree information included in the association information on the road map in the map data stored in the terminal map data storage unit 31 on the display device 16 using the received association information.

According to the congestion prediction information display system 1 and the congestion prediction information display method in the first modification example, the server device 3 does not need to transmit the map data associated with the congestion prediction degree as the association information, and thus, it is possible to prevent an increase in communication volume.

In the embodiment described above, for example, as the congestion prediction information display system 1 in the first modification example illustrated in FIG. 5, the information terminal 2 may include the terminal map data storage unit 31 that stores the map data and a terminal guidance route calculation unit 32 that calculates the guidance route from the departure point to the destination.

In this first modification example, in the case where the instruction information which instructs the calculation of the guidance route and the information of the departure point and the destination of the guidance route are input from the input device 15, the information terminal 2 which received the association information from the server device 3 corrects the link cost stored in the terminal map data storage unit 31 by the terminal guidance route calculation unit 32 using the received association information, and calculates the guidance route using the corrected link cost.

In the first modification example described above, the guidance route calculation unit 29 in the server device 3 may be eliminated.

Figure 6:
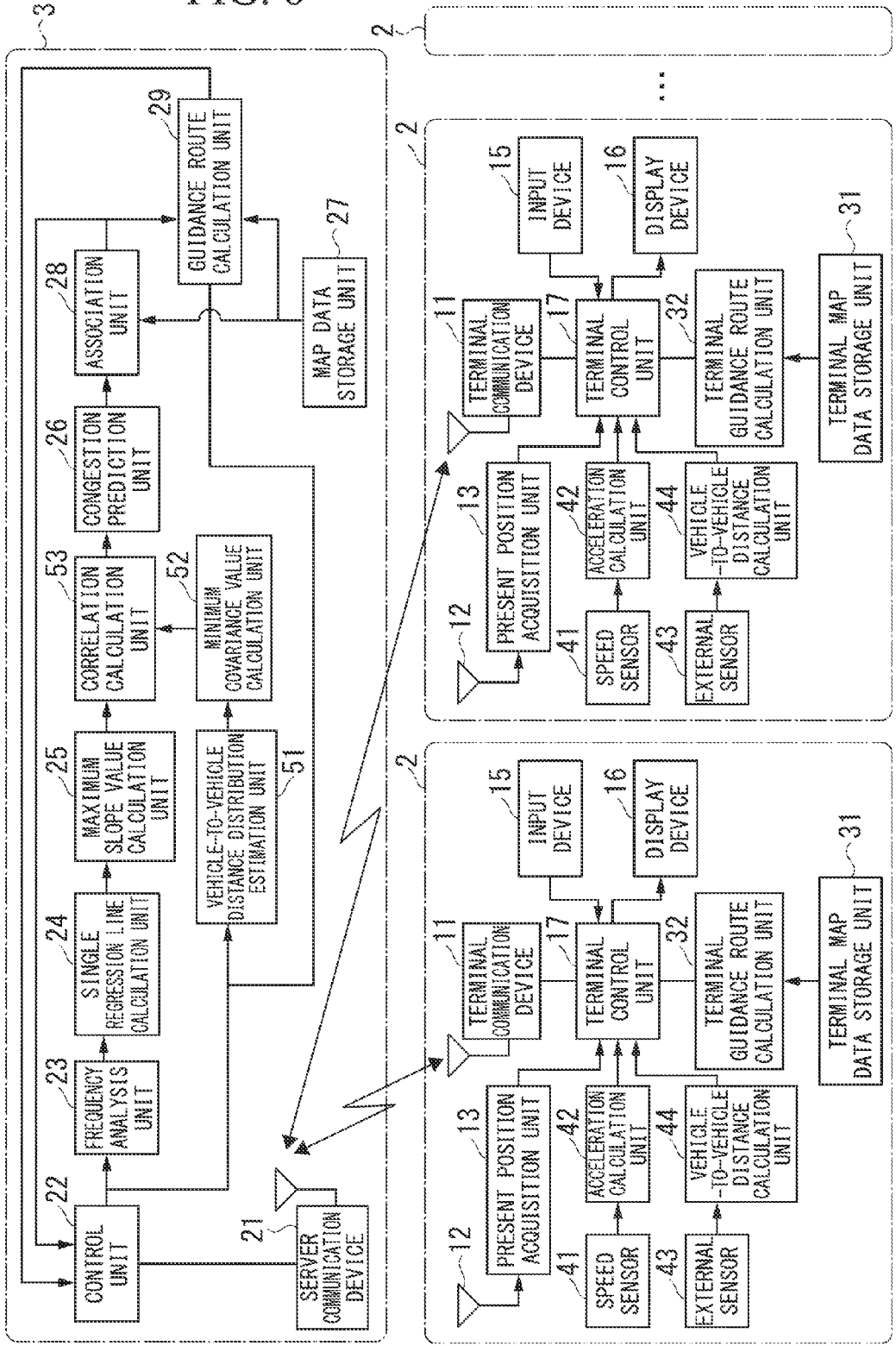
FIG. 6 is a configuration diagram of a congestion prediction information display system in a second modification example in the embodiment of the present invention.

In the embodiment described above, for example, as the congestion prediction information display system 1 in the second modification example illustrated in FIG. 6, the server device 3 may calculate the congestion prediction degree based on the acceleration of the information terminal 2 and the information of the vehicle-to-vehicle distance between the vehicle that moves together with the information terminal 2 and the preceding vehicle.

In this second modification example, the congestion prediction information display system 1 has a configuration different from that in the first modification example in a point that a speed sensor 41 and an acceleration calculation unit 42, an external sensor 43, and a vehicle-to-vehicle distance calculation unit 44 are added to the information terminal 2 as a replacement for the acceleration sensor 14. Furthermore, a vehicle-to-vehicle distance distribution estimation unit 51, a minimum covariance value calculation unit 52, and a correlation calculation unit 53 are added to the server device 3.

That is, the information terminal 2 in the second modification example includes the terminal communication device 11, the positioning signal receiver 12, the present position acquisition unit 13, the input device 15, the display device 16, the terminal control unit 17, the terminal map data storage unit 31 that stores the map data, the terminal guidance route calculation unit 32 that calculates the guidance route from the departure point to the destination, the speed sensor 41, the acceleration calculation unit 42, the external sensor 43, and the vehicle-to-vehicle distance calculation unit 44.

Furthermore, the server device 3 in the second modification example includes the server communication device 21, the control unit 22, the frequency analysis unit 23, the single regression line calculation unit 24, the maximum slope value calculation unit 25, the congestion prediction unit 26, the map data storage unit 27, the association unit 28, the guidance route calculation unit 29, the vehicle-to-vehicle distance distribution estimation unit 51, the minimum covariance value calculation unit 52, and the correlation calculation unit 53.

The information terminal 2 is an information device that is detachably mounted on the vehicle so as to receive the signals output from, for example, the navigation device mounted on the vehicle or various sensors in the vehicle. The information terminal 2 can bi-directionally communicate with the server device 3 by the wireless communication via the wireless communication network system or a road-to-vehicle communication via a roadside communication device.

The speed sensor 41 detects a speed based on a wheel speed of the vehicle on which the information terminal 2 is mounted.

The acceleration calculation unit 42 calculates acceleration from a temporal change of the speed detected by the speed sensor 41.

The external sensor 43 includes a radar device or an imaging device that detect the outside of the vehicle on which the information terminal 2 is mounted.

The radar device divides a detection target region set on the outside (outside in front of the traveling direction or the like) of the vehicle on which the information terminal 2 is mounted into a plurality of angle regions, and transmits a transmission signal of electromagnetic wave in a manner of scanning each angle region. Then, the radar device receives a reflection signal of a reflection wave that is generated by the fact that each transmission signal is reflected by an object (for example, a preceding vehicle or the like) in the detection target region. Then, the radar device generates a detection signal according to the transmission signal and the reflection signal, for example, a detection signal according to the distance from the radar device to the object, and outputs the generated detection signal.

The imaging device includes a camera, and performs image processing on an image obtained by imaging an imaging region set in the outside (outside in front of the traveling direction) of the vehicle on which the information terminal 2 is mounted, generates image data (for example, a moving image or a plurality of still images intermittent in time series), and outputs a signal of the generated image data.

The vehicle-to-vehicle distance calculation unit 44 detects a preceding vehicle in front of the traveling direction of the vehicle on which the information terminal 2 is mounted, and calculates a vehicle-to-vehicle distance from the vehicle on which the information terminal 2 is mounted to the preceding vehicle based on the signal output from the external sensor 43.

The terminal control unit 17 transmits the present position information acquired by the present position acquisition unit 13, the acceleration information calculated by the acceleration calculation unit 42, and the information of the vehicle-to-vehicle distance calculated by the vehicle-to-vehicle distance calculation unit 44 to the server device 3 through the terminal communication device 11.

The control unit 22 of the server device 3 outputs the information of the vehicle-to-vehicle distance received from the information terminal 2 through the server communication device 21 to the vehicle-to-vehicle distance distribution estimation unit 51.

The vehicle-to-vehicle distance distribution estimation unit 51 estimates a vehicle-to-vehicle distance distribution based on the vehicle-to-vehicle distance between the vehicle on which the information terminal 2 is mounted and the preceding vehicle and the number of detected preceding vehicles.

For example, in the case where a vehicle group (that is, an aggregation of preceding vehicles in which the vehicle-to-vehicle distance is relatively dense) in front of the vehicle on which the information terminal 2 is mounted, is detected from the information of the vehicle-to-vehicle distance and the number of vehicles, the vehicle-to-vehicle distance distribution estimation unit 51 applies a Gaussian distribution (a probability density distribution) to each vehicle group using a distribution estimation method such as variational Bayesian method.

For example, in the case where two vehicle groups are detected, two vehicle groups can be captured as a distribution in which the two Gaussian distributions are linearly combined. For example, as illustrated in FIG. 7, a probability function P(X) that represents the total distribution can be obtained as a sum (a superimposition) of probability functions P1(X) and P2(X) that represent the two Gaussian distributions.

Figure 7:
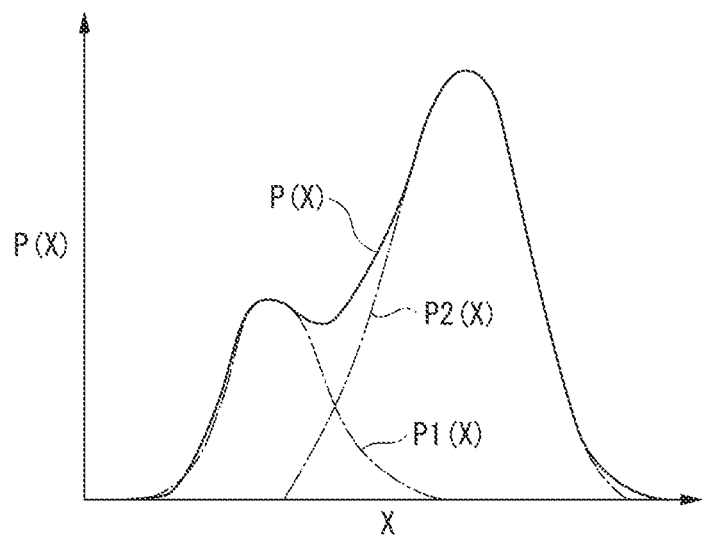
FIG. 7 is a diagram illustrating an example of a probability density distribution in the second modification example in the embodiment of the present invention.

Here, when the Gaussian distribution (the probability function) is expressed as $N(x|\mu, \Sigma)$, the superimposition of a plurality of Gaussian distributions illustrated in FIG. 7 is expressed as the following Equation (1).

[Equation 1]

$$p(x) = \sum_{k=1}^{K} \pi_k N\left(x \mid \mu_k, \sum_k\right) \quad (1)$$

In the Equation (1), for example, for any natural number k, an expected value (an average value) $\mu_k$ represents a position where the density is the highest. The covariance value (matrix) $\Sigma_k$ represents a distortion of the distribution, that is, represents to what extent the density will decrease when in which direction the $\mu$ will leave from the expected value $\mu_k$. A mixing coefficient (a mixing rate) $\pi_k$ ($0 \leq \pi_k \leq 1$) of the Gaussian distribution represents a contribution proportion of each Gaussian distribution, and means a probability.

The minimum covariance value calculation unit 52 performs calculation processing for obtaining a parameter (covariance) in which, for example, a likelihood function obtained from the above-described probability function P(X) becomes maximum using the variational Bayesian method or the like.

For example, the minimum covariance value calculation unit 52 calculates the covariance value $\Sigma k$ for each Gaussian distribution with respect to the probability function P(X) obtained as the superposition of a plurality of Gaussian distributions as illustrated in FIG. 7. Then, the minimum covariance value calculation unit 52 calculates the minimum value of a plurality of covariance values $\Sigma k$ obtained with respect to each Gaussian distribution.

Figure 8A:
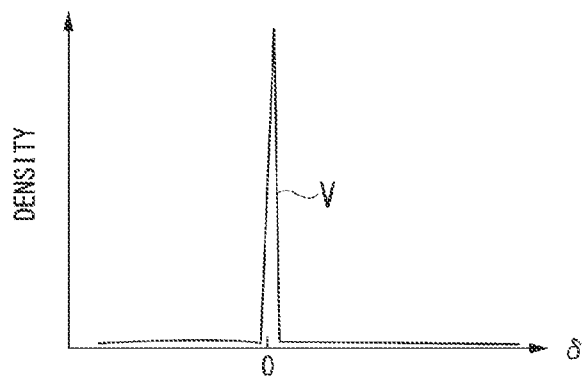
FIG. 8A is a diagram illustrating an example of a covariance value distribution in the second modification example in the embodiment of the present invention.

For example, in a graph V of the covariance value $\Sigma_k$ distribution illustrated in FIG. 8A, for a variable $\delta$ (for example, the covariance value $\Sigma_k$ itself or the like) in the covariance value $\Sigma_k$, the graph shows a sharp shape at the point where the variable $\delta$ is zero. This means that there is no variation in the vehicle group; in other words, the traveling state shows that the vehicle-to-vehicle distance is almost constant.

Figure 8B:
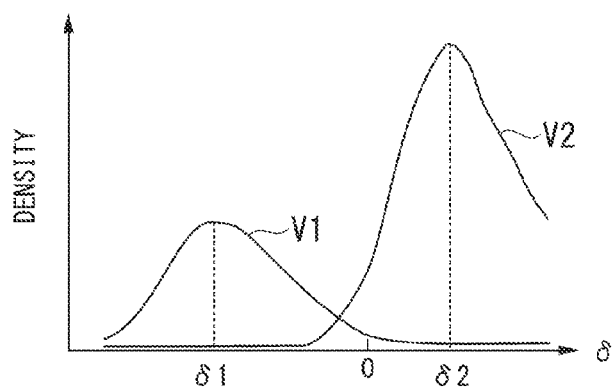
FIG. 8B is a diagram illustrating an example of a covariance value distribution in the second modification example in the embodiment of the present invention.

On the other hand, the covariance value $\Sigma_k$ distribution illustrated in FIG. 8B is configured of two graphs: a graph V1 which has a peak point at the value $\delta 1$ in the negative region of the variable $\delta$ in the covariance value $\Sigma_k$, and a graph V2 which has a peak point at the value $\delta 2$ in the positive region of the variable $\delta$ in the covariance value $\Sigma_k$. Each of the graphs V1 and V2 has a predetermined variation width with respect to the variable $\delta$ in the covariance value $\Sigma_k$. This means that there is a variation in vehicle group, in other words, there is a plurality of the aggregations of vehicles of which the vehicle-to-vehicle distances are different from each other.

Then, for example, in FIG. 8A, the minimum value (minimum covariance value) of the covariance value $\Sigma_k$ is almost zero, and for example, in FIG. 8B, the minimum value of the covariance value $\Sigma_k$ is $\delta 1$ which is the smaller one among two values of $\delta 1$ and $\delta 2$.

The correlation calculation unit 53 creates a correlation map between the maximum slope value calculated by the maximum slope value calculation unit 25 and the minimum covariance value calculated by the minimum covariance value calculation unit 52.

Figure 9:
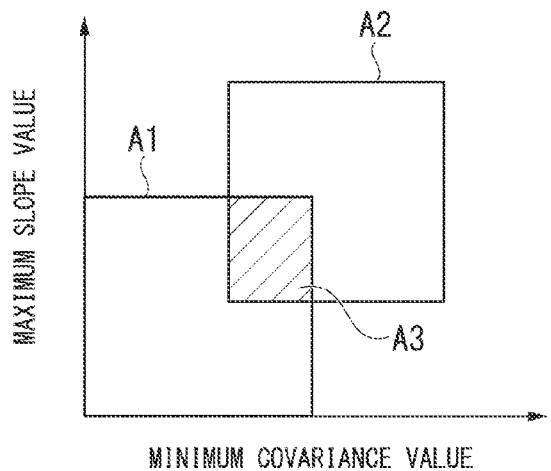
FIG. 9 is a diagram illustrating an example of a correlation map between a minimum covariance value and a maximum slope value in the second modification example in the embodiment of the present invention.

For example, in the image (conceptual) diagram of the correlation map between the maximum slope value and the minimum covariance value illustrated FIG. 9, the correlation of the variable (X, Y) is mapped with the horizontal (X) axis as a minimum covariance value X and the vertical (Y) axis as a maximum slope value Y.

For example, in the correlation map illustrated in FIG. 9, two regions of A1 and A2 are illustrated, and there is a boundary region A3 in which the two regions A1 and A2 overlap each other. The region A1 corresponds to a state in which the minimum covariance value is comparatively small and the variation of vehicle group is small, in other words, a state in which the vehicle-to-vehicle distance is comparatively constant. Conversely, the region A2 corresponds to a state in which the minimum covariance value is comparatively large and the variation of vehicle group is large, in other words, a state in which there is a plurality of the aggregations of vehicles of which the vehicle-to-vehicle distances are different each other.

The boundary region A3 is region where the state transits from the state in which the variation of vehicle group is small to the state in which the variation of vehicle group is large, and it is possible to perform the congestion prediction by quantitatively finding the state of the vehicle group corresponding to the boundary region A3.

Figure 10:
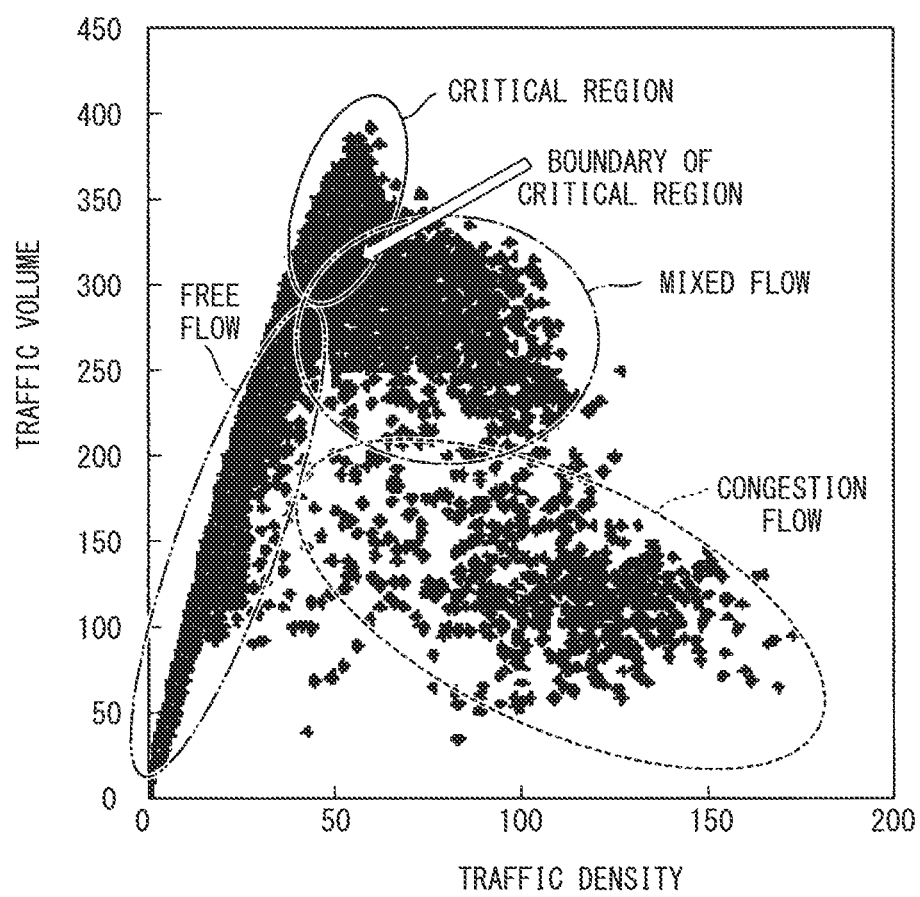
FIG. 10 is a diagram illustrating an example of a relationship between a traffic density and a traffic volume in the second modification example in the embodiment of the present invention.

For example, in the diagram illustrating the relationship between a traffic density and a traffic volume as illustrated in FIG. 10, the horizontal (X) axis of the graph represents the traffic density that means the number of other vehicles which are within a predetermined distance from an appropriate vehicle, and a reciprocal number of the traffic density corresponds to the vehicle-to-vehicle distance. The vertical (Y) axis represents a traffic volume that means the number of vehicles passing through a predetermined position.

For example, the diagram illustrating the relationship between the traffic density and the traffic volume as illustrated in FIG. 10 can be regarded as representing a traffic flow that means, so to speak, the flow of the vehicles.

The traffic flow illustrated in FIG. 10 can be divided into four major states (regions).

A first state is a state of free flow in which the possibility of the congestion occurring is low, and the acceleration and the vehicle-to-vehicle distance equal to or higher than a certain level can be secured here.

A second state is a state of mixed flow in which the braking state and the acceleration state of the vehicle are mixed. The state of mixed flow is a state before transition to a congestion flow. In the state of mixed flow, a degree of freedom of the driving by the driver decreases and the probability of transition to the congestion flow due to the increase of the traffic density (decrease of the vehicle-to-vehicle distance) is high.

A third state is a state of the congestion flow that indicates the congestion.

A fourth state is a critical region that is a transition state between the transitions from the state of free flow to the state of mixed flow. This critical region is a state in which the traffic volume and the traffic density is high compared to the free flow, and is a state of transition to the mixed flow due to the decrease of traffic volume and increase of traffic density (decrease of the vehicle-to-vehicle distance). Sometimes, the critical region is referred to as a semi-stable flow or meta-stable flow.

Then, for example, the region A1 illustrated in FIG. 9 includes the free flow and the critical region illustrated in FIG. 10, and, for example, the region A2 illustrated in FIG. 9 includes the state of the mixed flow and the congestion flow illustrated in FIG. 10.

Therefore, for example, the boundary region A3 illustrated in FIG. 9 is a boundary state that includes both of the critical region and the state of mixed flow illustrated in FIG. 10, and is a boundary of the critical region illustrated in, for example, FIG. 10.

By quantitatively grasping the critical region including the boundary of the critical region, it is possible to suppress the transition to the state of mixed flow and prevent the congestion from occurring.

Hereinafter, a quantification of the critical region will be described with reference to FIGS. 11(A) and 11(B) illustrating a correlation map between the logarithm of the minimum covariance value regarding the vehicle-to-vehicle distance distribution and the logarithm of the maximum slope value regarding the acceleration spectrum.

FIG. 11(A) is a simplified diagram of the map of traffic flow illustrated in FIG. 10, and FIG. 11(B) illustrates the correlation map between the logarithm of the minimum covariance value and the logarithm of the maximum slope value.

The logarithm of the minimum covariance value and the logarithm of the maximum slope value illustrated in FIG. 11(B) are calculated as the logarithmic values of the maximum slope value calculated by the maximum slope value calculation unit 25 and the minimum covariance value calculated by the minimum covariance value calculation unit 52, and represent the parameterization of the phase transition state in the critical region.

For example, in FIG. 11(B), the region B1 includes the critical region illustrated in FIG. 11(A) and the region B2 includes the state of mixed flow illustrated in FIG. 11(A). A critical line C means a critical point in which the possibility of congestion occurring is high if the state transits to the state of mixed flow beyond this critical line. The boundary region B3 of each region B1 and B2 corresponds to the boundary of the critical region immediately before the critical line C.

The correlation map illustrated in FIG. 11(B) is stored in the storage unit (not illustrated) in the correlation calculation unit 53.

The congestion prediction unit 26 determines whether or not the state of the boundary of the critical region exists in the correlation map created by the correlation calculation unit 53, and calculates the congestion prediction degree according to the determination result.

This congestion prediction degree indicates that, for example, the possibility (congestion prediction degree) of the congestion occurring in the future is higher than the predetermined threshold value corresponding to the case where the state of the boundary of the critical region exists in the correlation map, and indicates that the possibility (congestion prediction degree) of occurring of the congestion in the future is lower than the predetermined threshold value corresponding to the case where the state of the boundary of the critical region does not exist in the correlation map.

The congestion prediction information display system 1 in the second modification example has a configuration described above. Next, the operation of the congestion prediction information display system 1 will be described.

Hereinafter, the operation of the information terminal 2 will be described.

Figure 12A:
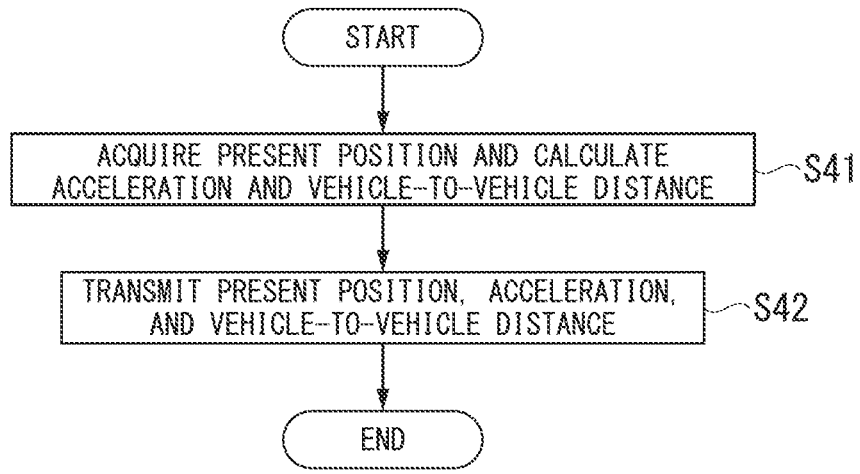
FIG. 12A is a flowchart illustrating an operation of an information terminal in the second modification example in the embodiment of the present invention.
Figure 12B:
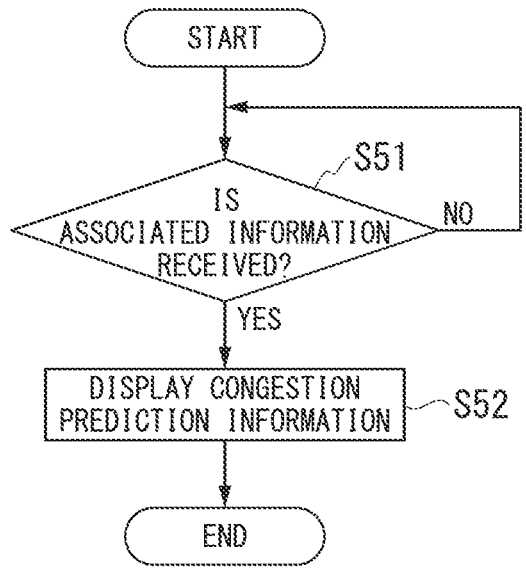
FIG. 12B is a flowchart illustrating an operation of an information terminal in the second modification example in the embodiment of the present invention.

In the information terminal 2, each processing illustrated in FIGS. 12A and 12B is independently and repeatedly performed in a predetermined period.

First, for example, in STEP S41 illustrated in FIG. 12A, the present position of the information terminal 2 is acquired by the present position acquisition unit 13 and the acceleration of the vehicle on which the information terminal 2 mounted is detected by the acceleration calculation unit 42, and the vehicle-to-vehicle distance between the vehicle on which the information terminal 2 is mounted and the preceding vehicle is calculated by the vehicle-to-vehicle distance calculation unit 44.

Next, in STEP S42, the present position information, the acceleration information, and the information of the vehicle-to-vehicle distance are transmitted to the server device 3, and the process proceeds to "end".

In addition, in STEP S51 (terminal receiving step) illustrated in FIG. 12B, it is determined whether or not the association information is received from the server device 3.

In the case where the determination result is "NO", the determination processing in STEP S51 is repeated.

On the other hand, in the case where the determination result is "YES", the process proceeds to STEP S52.

Then, in STEP S52 (display control step), the congestion prediction degree is displayed on the road map on the display device 16 using the association information, and the process proceeds to "end".

Hereinafter, the operation of the server device 3 will be described.

Figure 13:
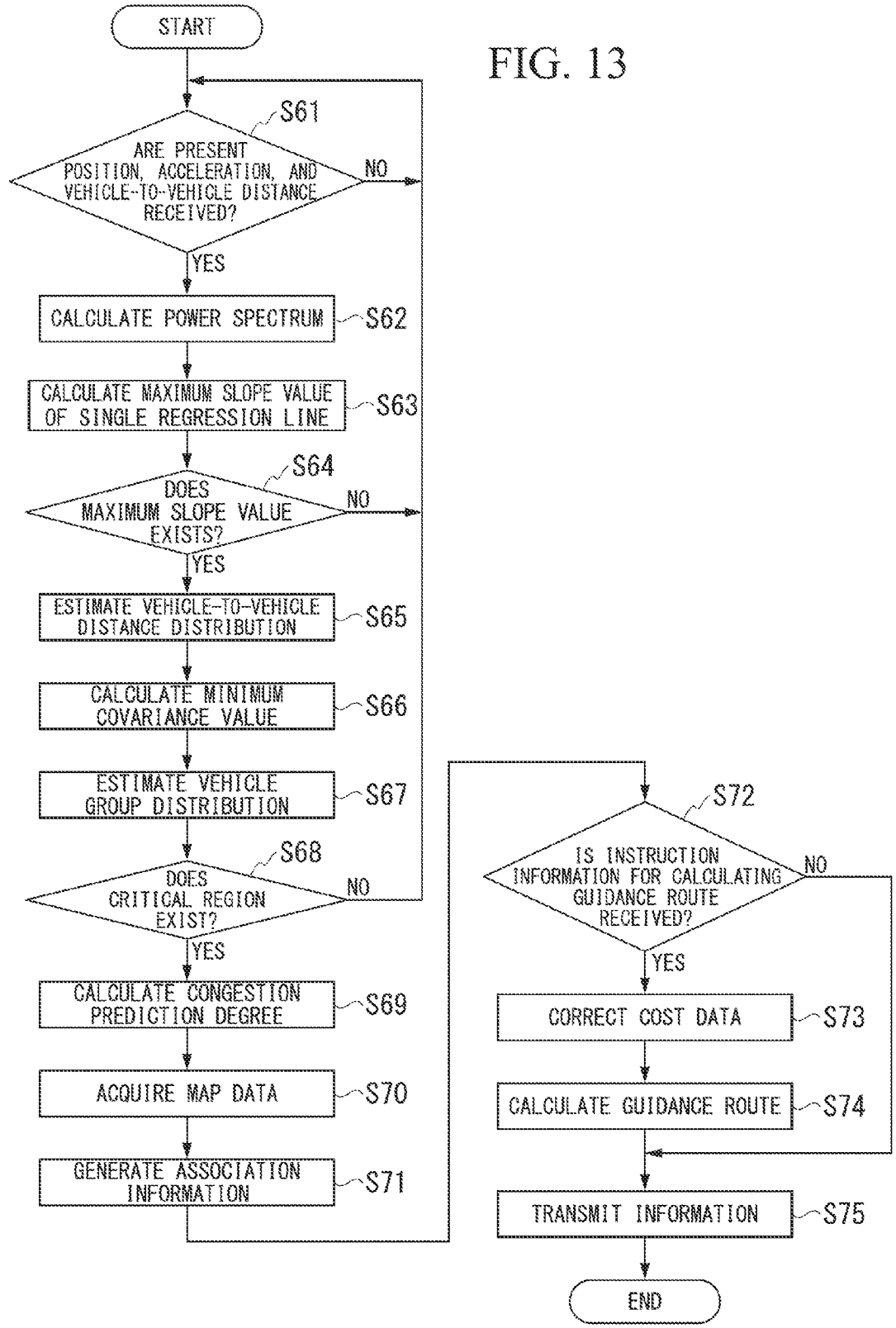
FIG. 13 is a flowchart illustrating an operation of a server device in the second modification example in the embodiment of the present invention.

In the server device 3, the processing illustrated in FIG. 13 is repeatedly performed in a predetermined period.

First, for example, in STEP S61 (a position information acquisition step or a congestion prediction information output step) illustrated in FIG. 13, it is determined whether or not the present position information and the acceleration information of the vehicle on which the information terminal 2 is mounted, and the information of the vehicle-to-vehicle distance are received from the information terminal 2.

In the case where the determination result is "NO", the determination processing in STEP S61 is repeated.

On the other hand, in the case where the determination result is "YES", the process proceeds to STEP S62.

Next, in STEP S62 (the congestion prediction information output step), the frequency analysis is performed on the acceleration of the vehicle on which the information terminal 2 is mounted, and the power spectrum corresponding to the frequency is calculated.

Next, in STEP S63 (the congestion prediction information output step), the single regression line in the power spectrum is calculated, and the maximum value of the amount of variations of the slope of the single regression line within the predetermined frequency range is calculated as the maximum slope value.

Next, in STEP S64 (the congestion prediction information output step), it is determined whether or not the maximum slope value (for example, the maximum slope value equal to or greater than the predetermined value) is calculated.

In the case where the determination result is "NO", the process returns to STEP S61.

On the other hand, in the case where the determination result is "YES", the process proceeds to STEP S65.

Then, in STEP S65 (the congestion prediction information output step), the vehicle-to-vehicle distance distribution is estimated based on the vehicle-to-vehicle distance between the vehicles on which the information terminal 2 is mounted and the preceding vehicle, and the number of detected preceding vehicles.

Next, in STEP S66 (congestion prediction information output step), the minimum covariance value is calculated from the vehicle-to-vehicle distance distribution.

Next, in STEP S67 (congestion prediction information output step), a vehicle group distribution in front of the traveling direction of the vehicle on which the information terminal 2 is mounted is estimated from the correlation between the minimum covariance value and the maximum slope value.

In STEP S68 (congestion prediction information output step), it is determined whether or not the state of the boundary of the critical region exists in the correlation map between the minimum covariance value and the maximum slope value of the acceleration spectrum.

In the case where the determination result is "NO", the process returns to above-described STEP S61.

On the other hand, in the case where the determination result is "YES", the process proceeds to STEP S69.

Next, in STEP S69 (the congestion prediction information output step), the congestion prediction degree that indicates the possibility of occurring the congestion in the future, and further, the possibility that the congestion has already occurred is calculated according to the maximum slope value.

Next, in STEP S70, the map data of a predetermined range is acquired from the map data storage unit 27 according to the present position of the vehicle on which the information terminal 2 is mounted.

Next, in STEP S71 (an association step), the congestion prediction degree is associated with the map data such that the congestion prediction degree can be displayed on the road map in the map data, and the association information that indicates the association of the congestion prediction degree with the map data is generated. For example, in the case where the absolute value of the maximum slope value is greater than the predetermined range (for example, the range of 30° to 45°), the congestion prediction degree is assumed to indicate the congestion trend, and thus, the display color of blue is associated with the road section or the point. On the other hand, in the case where the absolute value of the maximum slope value is smaller than the predetermined range (for example, the range of 30° to 45°), the congestion prediction degree is assumed to indicate the non-congestion trend, and thus, the display color of green is associated with the road section or the point.

Next, in STEP S72, it is determined whether or not the instruction information which instructs the calculation of the guidance route and the information of the departure point and the destination of the guidance route are received from the information terminal 2.

In the case where the determination result is "NO", the process returns to STEP S75 described below.

On the other hand, in the case where the determination result is "YES", the process proceeds to STEP S73.

Next, in STEP S73, the link cost stored in the map data storage unit 27 is corrected according to the association information.

Next, in STEP S74, using the corrected link cost, the guidance route from the departure point to the destination is calculated according to the information which instructs giving priority to reducing the time required for moving on the guidance route or the information which instructs giving priority to reducing the consumption of energy required for moving on the guidance route that are included in the instruction information which instructs the calculation of the guidance route.

Next, in STEP S75 (a transmission step), the association information that indicates the association of the congestion prediction degree with the map data, or the association information and the guidance route information are transmitted to the information terminal 2, and the process proceeds to "end".

According to the congestion prediction information display system 1 and the congestion prediction information display method in the second modification example, by calculating the congestion prediction degree using a combination of the acceleration of the vehicle on which the information terminal 2 is mounted and the easily acquirable information of the vehicle-to-vehicle distance between the vehicle on which the information terminal 2 is mounted and the preceding vehicle, it is possible to improve the calculation accuracy and reliability of the congestion prediction degree.

In the embodiment and each modification example described above, elements for realizing at least a part of the function of the server device 3 may be included in the information terminal 2.

Figure 14:
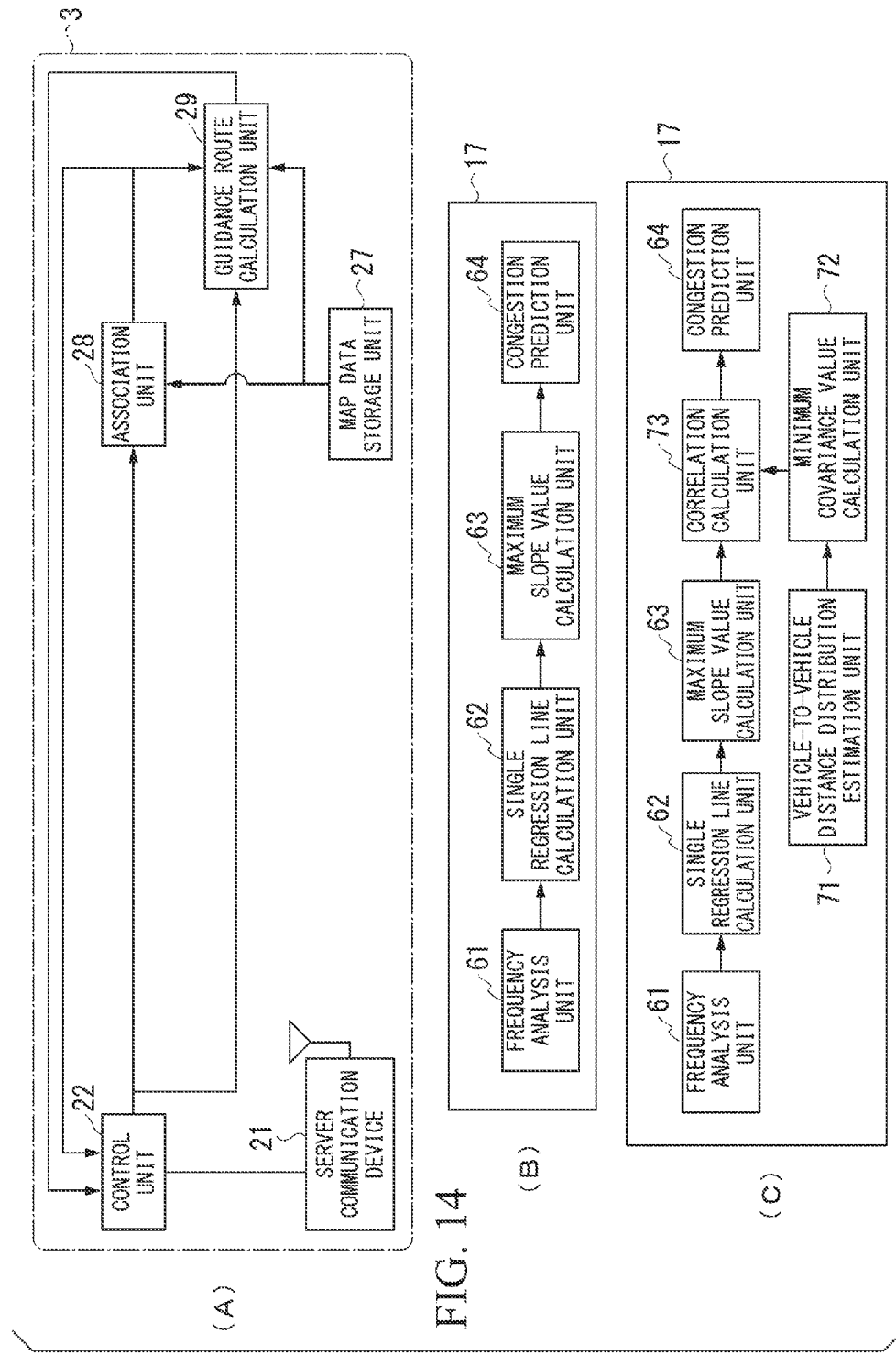
FIG. 14 is a configuration diagram of a server device in a third modification example and a fourth modification example in the embodiment of the present invention, a configuration diagram of a terminal control unit of the information terminal in the third modification example, and a configuration diagram of a terminal control unit of the information terminal in the fourth modification example.

For example, in the congestion prediction information display system 1 in a third modification example, as illustrated in FIGS. 14(A) and 14(B), as a configuration corresponding to the frequency analysis unit 23, the single regression line calculation unit 24, the maximum slope value calculation unit 25, and the congestion prediction unit 26 in the server device 3 in the above-described embodiment, a frequency analysis unit 61, a single regression line calculation unit 62, a maximum slope value calculation unit 63, and a congestion prediction unit 64 may be included in the terminal control unit 17 of the information terminal 2.

In the third modification example, the terminal control unit 17 of the information terminal 2 transmits the present position information acquired by the present position acquisition unit 13 and the congestion prediction degree information calculated by the congestion prediction unit 64 based on the acceleration detected by the acceleration sensor 14 to the server device 3 through the terminal communication device 11. Then, the control unit 22 of the server device 3 outputs the present position information and the congestion prediction degree information received from the information terminal 2 through the server communication device 21 to the association unit 28.

Figure 15:
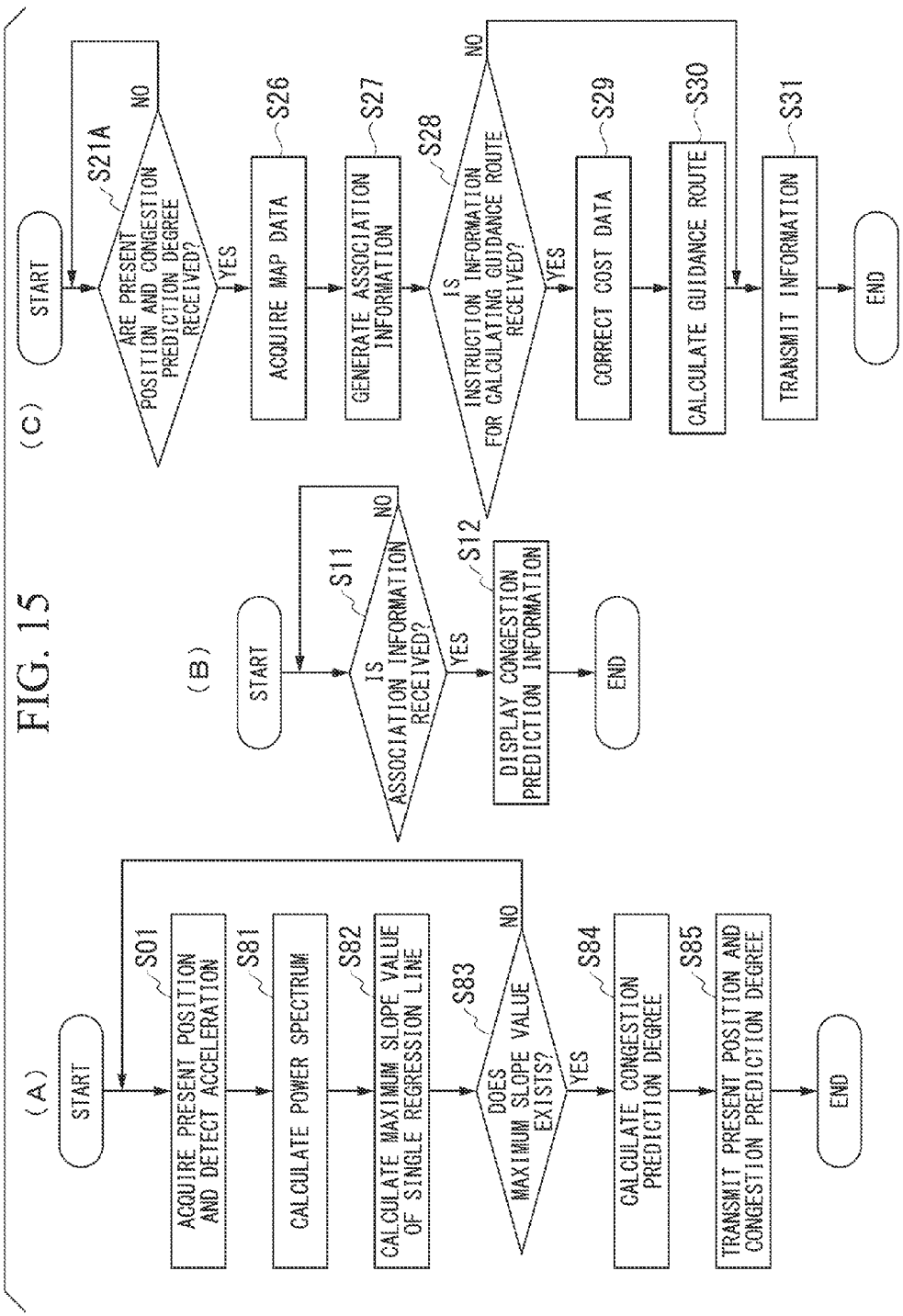
FIG. 15 is a flowchart illustrating operations of the information terminal and the server device in the third modification example in the embodiment of the present invention.

In the operation of the congestion prediction information display system 1 in the third modification example, as illustrated in FIGS. 15(A) and 15(B), the information terminal 2 performs processing tasks from S81 to S84 as the processing tasks corresponding to S22 to S25 executed by the server device 3 in the operation of the congestion prediction information display system 1 in the embodiment described above. Then, the information terminal 2 transmits the present position information and the congestion prediction degree information to the server device 3 in STEP S85, and the process proceeds to "end". Then, as illustrated in FIG. 15(C), the server device 3 firstly determines whether or not the present position information of the information terminal 2 and the congestion prediction degree information are received from the information terminal 2 in STEP S21A (the position information acquisition step or the congestion prediction information output step), and in the case where the determination result is "YES", performs the processing tasks in STEP S26 to S31 in the embodiment described above.

In addition, for example, in the congestion prediction information display system 1 in the fourth modification example, as illustrated in FIGS. 14(A) and 14(C), a frequency analysis unit 61, a single regression line calculation unit 62, a maximum slope value calculation unit 63, a congestion prediction unit 64, a vehicle-to-vehicle distance distribution estimation unit 71, a minimum covariance value calculation unit 72, and a correlation calculation unit 73 are included in the terminal control unit 17 of the information terminal 2 as a configuration corresponding to the frequency analysis unit 23, the single regression line calculation unit 24, the maximum slope value calculation unit 25, the congestion prediction unit 26, the vehicle-to-vehicle distance distribution estimation unit 51, the minimum covariance value calculation unit 52, and the correlation calculation unit 53 of the server device 3 in the second modification example in the embodiment described above.

In the fourth modification example, the terminal control unit 17 of the information terminal 2 transmits the present position information acquired by the present position acquisition unit 13 and the congestion prediction degree information calculated by the congestion prediction unit 64 based on the acceleration detected by the acceleration sensor 14 and the vehicle-to-vehicle distance calculated by the vehicle-to-vehicle distance calculation unit 44 to the server device 3 through the terminal communication device 11. Then, the control unit 22 of the server device 3 outputs the present position information and the congestion prediction degree information received from the information terminal 2 through the server communication device 21 to the association unit 28.

Figure 16:
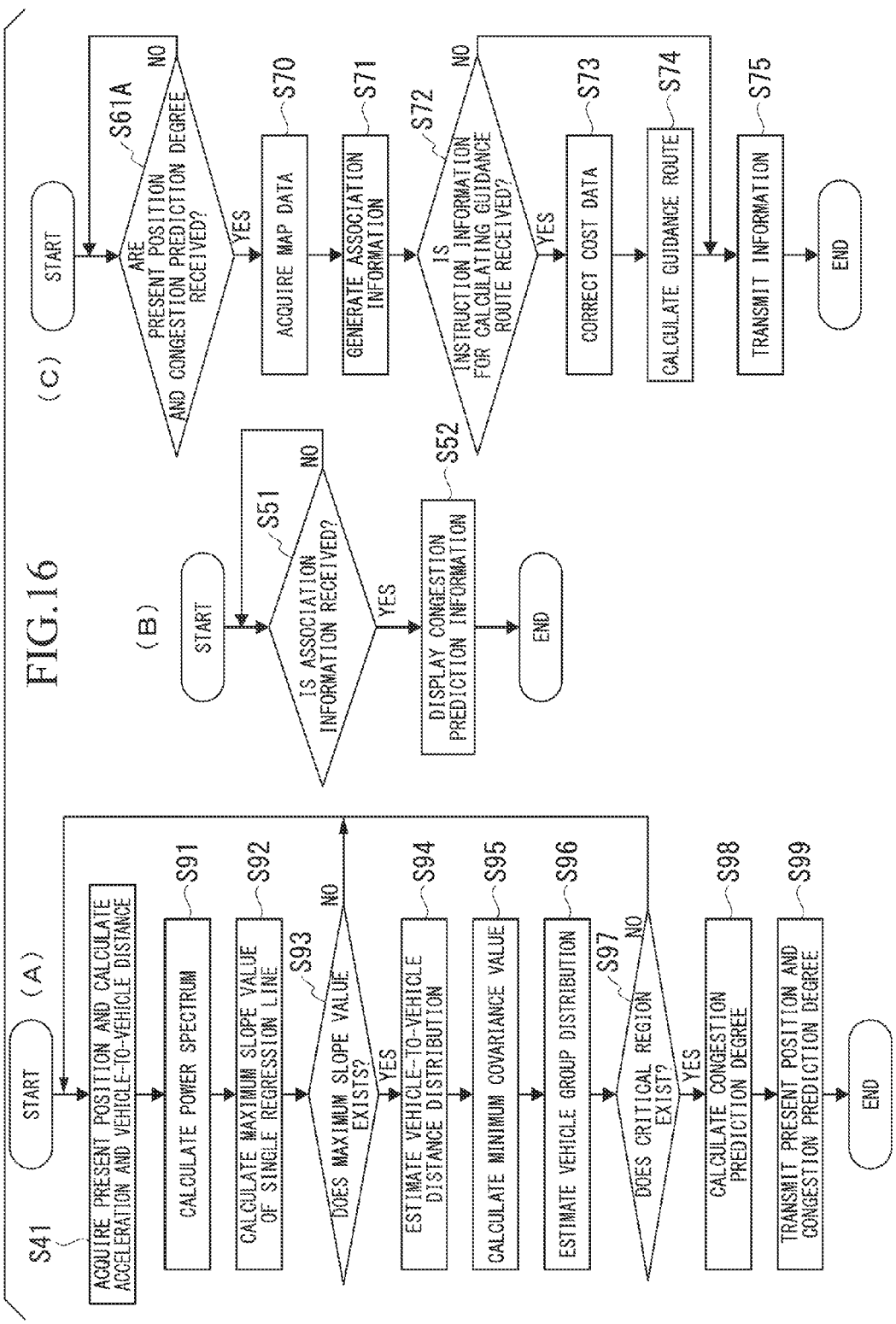
FIG. 16 is a flowchart illustrating operations of the information terminal and the server device in the fourth modification example in the embodiment of the present invention.

In the operation of the congestion prediction information display system 1 in the fourth modification example, as illustrated in FIGS. 16(A) and 16(B), the information terminal 2 performs processing tasks from STEPs S91 to S98 as the processing tasks corresponding to STEPs S62 to S69 performed by the server device 3 in the operation of the congestion prediction information display system 1 in the second modification example in the embodiment described above. Then, the information terminal 2 transmits the present position information and the congestion prediction degree information to the server device 3 in STEP S99, and the process proceeds to "end". Then, as illustrated in FIG. 16(C), the server device 3 firstly determines whether or not the present position information of the information terminal 2 and the congestion prediction degree information are received from the information terminal 2 in STEP S61A (the position information acquisition step or the congestion prediction information output step), and in the case where the determination result is "YES", performs the processing tasks in STEPs S70 to S75, in the second modification example in the embodiment described above.

The information terminal 2 and the server device 3 of the congestion prediction information display system 1 in the embodiment described above and each modification example may be realized by dedicated hardware, or by recording a program for realizing the function of the information terminal 2 and the server device 3 in a computer-readable recording medium, and causing a computer system to read and execute the program recorded in the recording medium, the computer system may operate as the information terminal 2 and the server device 3. The computer system described here is assumed to include OS and hardware such as peripherals. In addition, the computer system is assumed to also include a WWW system which includes the website providing environment (or display environment).

In addition, the computer-readable recording medium means a portable medium such as a flexible disk, a magneto-optical disk, ROM, CD-ROM, and the storage device such as a hard disk embedded in the computer system. Furthermore, the computer-readable recording medium is assumed to include a medium that holds the program for a certain time such as a volatile memory (RAM) in the computer system as a server and a client in the case where the program is transmitted via a network such as the internet or a communication line such as a telephone line.

In addition, the program described above may be transmitted to another computer system from the computer system that stores the program in the storage device or the like via a transmission medium or a transmission wave in the transmission medium. Here, the transmission medium that transmits the program means a medium having a function of transmitting information such as the network (communication network) such as the internet or a communication line (communication line) such as a telephone line.

In addition, the program described above may be a program that can realize part of the functions described above.

Furthermore, the program described above may be a program that can realize the functions described above in combination with the program which is already stored in the computer system, what is called a differential file (differential program).

The above-described embodiment is presented as an example, and is not intended to limit the scope of the invention. The above-described new embodiment can be implemented in various other forms, and various omissions, substitutions, changes can be performed without departing from the spirit of the invention. The embodiment described above and the variations thereof will be included in the range or spirit of the invention and included in the invention described in the Claims attached hereto and the ranges equivalent thereto. For example, in the embodiment described above, one server device 3 is included in the configuration. However, a plurality of devices may be included in the configuration by connecting through the communication line or the like.

REFERENCE SIGNS LIST 1 congestion prediction information display system
2 information terminal
3 server device
12 positioning signal receiver (position detection portion)
13 present position acquisition unit (position detection portion)
14 acceleration sensor (acceleration detection portion)
15 input device (terminal information acquisition unit)
16 display device
17 terminal control unit (terminal reception portion, display control portion, terminal transmission portion)
22 control unit (position information acquisition portion, congestion prediction information output portion, transmission portion, acceleration information acquisition portion, instruction information acquisition portion)
26 congestion prediction unit (congestion prediction information output portion, congestion prediction information generation portion)
27 map data storage unit (map data storage portion)
28 association unit (association portion)
29 guidance route calculation unit (guidance route calculation portion)
31 terminal map data storage unit (terminal map data storage portion)
32 terminal guidance route calculation unit (terminal guidance route calculation portion)
41 speed sensor (acceleration detection portion)
42 acceleration calculation unit (acceleration detection portion)
64 congestion prediction unit (terminal congestion prediction information generation portion)

The invention claimed is:

1. A server device comprising:
a position information acquisition portion configured to acquire position information of a moving body;
a congestion prediction information output portion configured to:
calculate a power spectrum corresponding to a frequency from a frequency analysis of an acceleration of the moving body;
calculate a single regression line of the calculated power spectrum;
calculate a maximum value of a variation amount of a slope of the single regression line within a predetermined frequency range as a maximum slope value;
acquire or generate a congestion prediction information which is based on the maximum slope value; and
output the congestion prediction information;
a map data storage portion configured to store map data of a road map;
an association portion configured to associate the congestion prediction information with the map data stored in the map data storage portion using the position information acquired by the position information acquisition portion such that the congestion prediction information output from the congestion prediction information output portion can be displayed on the road map, and to generate an association information that indicates an association between the congestion prediction information and the map data; and
a transmission portion configured to transmit the association information generated by the association portion to an outside,
wherein, in a case where the maximum slope value exists, the congestion prediction information output portion calculates the congestion prediction information by:
estimating a moving body-to-moving body distance distribution based on moving body-to-moving body distances between a target moving body and preceding moving bodies preceding the target moving body and a number of the preceding moving bodies, the moving body-to-moving body distance distribution being in reference to the target moving body;
calculating a minimum covariance value from the moving body-to-moving body distance distribution;
estimating a moving body group distribution in front of a traveling direction of the target moving body from a correlation between the minimum covariance value and the maximum slope value;
defining, based on the moving body group distribution, a first state where a possibility that a congestion occurs is lower, a second state where braking states and acceleration states of the moving bodies are mixed, a third state where a congestion occurs, and a fourth state where the first state is transiting to the second state; and
identifying, in a region including the target moving body, the second state, the fourth state, and a fifth state which is a boundary between the second state and the fourth state by using a correlation between a logarithm of the minimum covariance value and a logarithm of the maximum slope value.

2. The server device according to claim 1,
wherein the congestion prediction information output portion includes
an acceleration information acquisition portion configured to acquire an acceleration information of the moving body, and
a congestion prediction information generation portion configured to generate the congestion prediction information based on the acceleration information acquired by the acceleration information acquisition portion.

3. The server device according to claim 1,
wherein the map data includes data of points on the road and data of road sections that connect the points, and
wherein the association portion associates a display color corresponding to the congestion prediction information with the road section or the point in the map data such that the road section or the point having the display color corresponding to the congestion prediction information can be displayed on the road map.

4. The server device according to claim 3,
wherein the map data includes cost data that indicates a distance of the road section or a time required for moving the road section,
wherein the server device further comprises:
an instruction information acquisition portion configured to acquire instruction information which instructs the calculation of the guidance route from a departure point to a destination and information of the departure point and destination; and
a guidance route calculation portion configured to correct the cost data stored in the map data storage portion using the association information generated by the association portion in a case where the instruction information is acquired by the instruction information acquisition portion, and to calculate the guidance route using the corrected cost data, and
wherein the transmission portion transmits the guidance route information calculated by the guidance route calculation portion to the outside.

5. The server device according to claim 4,
wherein the guidance route calculation portion calculates the guidance route by giving priority to reducing the time required for moving on the guidance route or on reducing the consumption of energy required for moving on the guidance route.

6. A congestion prediction information display system that includes the server device according to claim 1, an information terminal, and a display device,
wherein the information terminal includes
a terminal reception portion configured to receive the association information transmitted from the server device, and
a display control portion configured to display the congestion prediction information on the road map on the display device using the association information received by the terminal reception portion.

7. The congestion prediction information display system according to claim 6,
wherein the information terminal further comprises:
the display device;
a position detection portion configured to detect a position of the information terminal;
an acceleration detection portion configured to detect acceleration of the information terminal; and
a terminal transmission portion configured to transmit the position information detected by the position detection portion and an acceleration information detected by the acceleration detection portion to the server device,
wherein the congestion prediction information output portion of the server device comprises:
an acceleration information acquisition portion configured to receive the acceleration information transmitted from the information terminal as an acceleration information of the moving body; and
a congestion prediction information generation portion configured to generate the congestion prediction information using the acceleration information acquired by the acceleration information acquisition portion, and
wherein the position information acquisition portion of the server device receives the position information transmitted from the information terminal as position information of the moving body.

8. The congestion prediction information display system according to claim 6,
wherein the information terminal further comprises:
the display device;
a position detection portion configured to detect a position of the information terminal;
an acceleration detection portion configured to detect an acceleration of the information terminal;
a terminal congestion prediction information generation portion configured to generate the congestion prediction information using the acceleration information detected by the acceleration detection portion; and
a terminal transmission portion configured to transmit the position information detected by the position detection portion and the congestion prediction information generated by the terminal congestion prediction information generation portion to the server device,
wherein the congestion prediction information output portion of the server device receives the congestion prediction information transmitted from the information terminal as the congestion prediction information of the moving body, and
wherein the position information acquisition portion of the server device receives the position information transmitted from the information terminal as the position information of the moving body.

9. The congestion prediction information display system according to claim 6,
wherein the information terminal further comprises a terminal map data storage portion configured to store the map data,
wherein the map data includes data of a point on the road and data of a road section that connects the points, and
wherein the display control portion displays the congestion prediction information on the road map which is obtained from the map data stored in the terminal map data storage portion on the display device using the association information received by the terminal reception portion.

10. The congestion prediction information display system according to claim 9,
wherein the map data comprises cost data that indicates a distance of the road section or a time required for moving on the road section, and
wherein the information terminal further comprises:
a terminal information acquisition portion configured to acquire instruction information which instructs the calculation of the guidance route from a departure point to a destination and information of the departure point and destination; and
a terminal guidance route calculation portion configured to correct the cost data stored in the terminal map data storage portion using the association information received by the terminal reception portion in a case where the instruction information is acquired by the terminal information acquisition portion, and to calculate the guidance route using the corrected cost data.

11. A congestion prediction information distribution method that is executed by a server device including a map data storage portion configured to store map data of a road map, the method comprising:
a position information acquisition step of acquiring position information of moving body;
a congestion prediction information output step of:
calculating a power spectrum corresponding to a frequency from a frequency analysis of an acceleration of the moving body;
calculating a single regression line of the calculated power spectrum;
calculating a maximum value of a variation amount of a slope of the single regression line within a predetermined frequency range as a maximum slope value;
acquiring or generating a congestion prediction information which is based on the maximum slope value; and
outputting the congestion prediction information;
an association step of associating the congestion prediction information with the map data stored in the map data storage portion using the position information acquired in the position information acquisition step such that the congestion prediction information output in the congestion prediction information output step can be displayed on the road map, and of generating an association information that indicates an association between the congestion prediction information and the map data; and
a transmission step of transmitting the association information generated in the association step to an outside,
wherein, in a case where the maximum slope value exists, the congestion prediction information output step calculates the congestion prediction information by:
estimating a moving body-to-moving body distance distribution based on moving body-to-moving body distances between a target moving body and preceding moving bodies preceding the target moving body and a number of the preceding moving bodies, the moving body-to-moving body distance distribution being in reference to the target moving body;
calculating a minimum covariance value from the moving body-to-moving body distance distribution;
estimating a moving body group distribution in front of a traveling direction of the target moving body from a correlation between the minimum covariance value and the maximum slope value;
defining, based on the moving body group distribution, a first state where a possibility that a congestion occurs is lower, a second state where braking states and acceleration states of the moving bodies are mixed, a third state where a congestion occurs, and a fourth state where the first state is transiting to the second state; and
identifying, in a region including the target moving body, the second state, the fourth state, and a fifth state which is a boundary between the second state and the fourth state by using a correlation between a logarithm of the minimum covariance value and a logarithm of the maximum slope value.

12. A congestion prediction information display method that is executed by a congestion prediction information display system that includes a server device including a map data storage portion configured to store map data of a road map, an information terminal, and a display device, the method comprising:

a position information acquisition step of causing the
server device to acquire position information of a
moving body;
a congestion prediction information output step of causing
the server device to:
calculate a power spectrum corresponding to a frequency from a frequency analysis of an acceleration of the moving body;
calculate a single regression line of the calculated power spectrum;
calculate a maximum value of a variation amount of a slope of the single regression line within a predetermined frequency range as a maximum slope value;
acquire or generate a congestion prediction information which is based on the maximum slope value; and
output the congestion prediction information;
an association step of causing the server device to associate the congestion prediction information with the map data stored in the map data storage portion using the position information acquired in the position information acquisition step such that the congestion prediction information output in the congestion prediction information output step can be displayed on the road map, and to generate an association information that indicates an association between the congestion prediction information and the map data;
a transmission step of causing the server device to transmit the association information generated in the association step to an outside;
a terminal transmission step of causing the information terminal to receive the association information transmitted from the server device; and
a display control step of causing the information terminal to display the congestion prediction information on the road map on the display device using the association information received in the terminal transmission step,
wherein, in a case where the maximum slope value exists, the congestion prediction information output step calculates the congestion prediction information by:
estimating a moving body-to-moving body distance distribution based on moving body-to-moving body distances between a target moving body and preceding moving bodies preceding the target moving body and a number of the preceding moving bodies, the moving body-to-moving body distance distribution being in reference to the target moving body;
calculating a minimum covariance value from the moving body-to-moving body distance distribution;
estimating a moving body group distribution in front of a traveling direction of the target moving body from a correlation between the minimum covariance value and the maximum slope value;
defining, based on the moving body group distribution, a first state where a possibility that a congestion occurs is lower, a second state where braking states and acceleration states of the moving bodies are mixed, a third state where a congestion occurs, and a fourth state where the first state is transiting to the second state; and
identifying, in a region including the target moving body, the second state, the fourth state, and a fifth state which is a boundary between the second state and the fourth state by using a correlation between a logarithm of the minimum covariance value and a logarithm of the maximum slope value.

13. A program recorded on a non-transitory medium for causing a computer configuring a server device which includes a map data storage portion configured to store map data of a road map to function as:
a position information acquisition portion configured to acquire position information of a moving body;
a congestion prediction information output portion configured to:
calculate a power spectrum corresponding to a frequency from a frequency analysis of an acceleration of the moving body;
calculate a single regression line of the calculated power spectrum;
calculate a maximum value of a variation amount of a slope of the single regression line within a predetermined frequency range as a maximum slope value;
acquire or generate a congestion prediction information which is based on the maximum slope value; and
output the congestion prediction information;
an association portion configured to associate the congestion prediction information with the map data stored in the map data storage portion using the position information acquired by the position information acquisition portion such that the congestion prediction information output from the congestion prediction information output portion can be displayed on the road map, and to generate an association information that indicates an association between the congestion prediction information and the map data; and
a transmission portion configured to transmit the association information generated by the association portion to an outside,
wherein, in a case where the maximum slope value exists, the congestion prediction information output portion calculates the congestion prediction information by:
estimating a moving body-to-moving body distance distribution based on moving body-to-moving body distances between a target moving body and preceding moving bodies preceding the target moving body and a number of the preceding moving bodies, the moving body-to-moving body distance distribution being in reference to the target moving body;
calculating a minimum covariance value from the moving body-to-moving body distance distribution;
estimating a moving body group distribution in front of a traveling direction of the target moving body from a correlation between the minimum covariance value and the maximum slope value;
defining, based on the moving body group distribution, a first state where a possibility that a congestion occurs is lower, a second state where braking states and acceleration states of the moving bodies are mixed, a third state where a congestion occurs, and a fourth state where the first state is transiting to the second state; and
identifying, in a region including the target moving body, the second state, the fourth state, and a fifth state which is a boundary between the second state and the fourth state by using a correlation between a logarithm of the minimum covariance value and a logarithm of the maximum slope value.

14. A program recorded on a non-transitory medium for causing a computer configuring an information terminal of a congestion prediction information display system that includes the server device according to claim 1, the information terminal, and a display device to function as:
a terminal reception portion configured to receive the association information transmitted from the server device; and a display control portion configured to display the congestion prediction information on the road map on the display device using the association information received from the terminal reception portion.

* * * * *